(12) United States Patent
Dawson et al.

(10) Patent No.: US 12,388,211 B2
(45) Date of Patent: Aug. 12, 2025

(54) ELECTRICAL CONNECTOR SYSTEM WITH CYLINDRICAL TERMINAL BODY

(71) Applicant: Eaton Intelligent Power Limited, Dublin (IE)

(72) Inventors: James Dawson, Carol Stream, IL (US); Jason Degen, Carol Stream, IL (US); Brantley Natter, Carol Stream, IL (US); Mohamad Zeidan, Carol Stream, IL (US); Slobodan Pavlovic, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 87 days.

(21) Appl. No.: 18/102,712

(22) Filed: Jan. 28, 2023

(65) Prior Publication Data

US 2023/0178920 A1 Jun. 8, 2023

Related U.S. Application Data

(63) Continuation of application No. PCT/US2021/043788, filed on Jul. 29, 2021.
(Continued)

(51) Int. Cl.
*H01R 13/15* (2006.01)
*B60R 16/03* (2006.01)
(Continued)

(52) U.S. Cl.
CPC .............. *H01R 13/44* (2013.01); *B60R 16/03* (2013.01); *H01R 13/052* (2013.01); *H01R 13/15* (2013.01);
(Continued)

(58) Field of Classification Search
CPC ...... H01R 13/44; H01R 13/052; H01R 13/15; H01R 13/18; H01R 13/187; H01R 13/42;
(Continued)

(56) References Cited

U.S. PATENT DOCUMENTS 5,951,336 A * 9/1999 Seko .................... H01R 13/432
439/748
7,651,344 B2 * 1/2010 Wu .................... H01R 13/6585
439/910
(Continued)

FOREIGN PATENT DOCUMENTS

WO 2019164536 A1 8/2019
WO 2019236976 A1 12/2019
(Continued)

OTHER PUBLICATIONS

Office Action issued for Korean Application No. 10-2023-7006315, dated Aug. 22, 2024.

*Primary Examiner* — Thanh Tam T Le
(74) *Attorney, Agent, or Firm* — Meunier Carlin & Curfman LLC

(57) ABSTRACT

A connector system for electrically connecting a power source to other power distribution components or assemblies, for example in a motor vehicle. This connector system includes a male connector assembly with an electrically conductive male terminal assembly having a male terminal body and an internal spring assembly. The male terminal body includes contact arms with irregular outer peripheries configured to reduce the insertion force associated with the male terminal body. The internal spring assembly includes a spring member and a spring holder that ensures and maintains proper relative positioning or alignment of the internal spring member within the male terminal assembly. The connector system also includes a female connector assembly (Continued)

with a female terminal assembly that receives the male terminal assembly and the spring assembly.

32 Claims, 25 Drawing Sheets

Related U.S. Application Data

(60) Provisional application No. 63/058,061, filed on Jul. 29, 2020.

(51) Int. Cl.
    *H01R 13/05*     (2006.01)
    *H01R 13/187*     (2006.01)
    *H01R 13/42*     (2006.01)
    *H01R 13/428*     (2006.01)
    *H01R 13/44*     (2006.01)
    *H01R 13/631*     (2006.01)
    *H01R 13/641*     (2006.01)

(52) U.S. Cl.
    CPC ........... *H01R 13/187* (2013.01); *H01R 13/42* (2013.01); *H01R 13/428* (2013.01); *H01R 13/631* (2013.01); *H01R 13/641* (2013.01); *H01R 2201/26* (2013.01)

(58) Field of Classification Search
    CPC .. H01R 13/428; H01R 13/631; H01R 13/641; H01R 2201/26; B60R 16/03
    See application file for complete search history.

(56) References Cited

U.S. PATENT DOCUMENTS

| | | | |
|---|---|---|---|
| 9,293,852 B2 * | 3/2016 | Glick | H01R 13/18 |
| 9,379,470 B2 * | 6/2016 | Glick | H01R 13/18 |
| 9,437,974 B2 | 9/2016 | Glick et al. | |
| 9,444,205 B2 * | 9/2016 | Rangi | H01R 24/86 |
| 9,653,859 B1 | 5/2017 | Moore et al. | |
| 9,905,953 B1 * | 2/2018 | Pavlovic | H01R 13/187 |
| 10,193,247 B1 * | 1/2019 | Glick | H01R 13/18 |
| 10,283,889 B2 * | 5/2019 | Glick | H01R 13/11 |
| 10,396,482 B2 * | 8/2019 | Glick | H01R 13/08 |
| 10,693,252 B2 | 6/2020 | Pavlovic et al. | |
| 11,069,999 B2 * | 7/2021 | Fisher | H01R 13/08 |
| 2015/0074996 A1 | 3/2015 | Glick et al. | |

FOREIGN PATENT DOCUMENTS

| | | |
|---|---|---|
| WO | 2019237009 A1 | 12/2019 |
| WO | 2019237046 A1 | 12/2019 |
| WO | 2020150399 A1 | 7/2020 |
| WO | 2020154330 A1 | 7/2020 |
| WO | 2021050499 A1 | 3/2021 |
| WO | 2021050609 A1 | 3/2021 |
| WO | 2022026695 A1 | 2/2022 |
| WO | 2022040636 A1 | 2/2022 |
| WO | 2022055568 A1 | 3/2022 |
| WO | 2022098799 A2 | 5/2022 |
| WO | 2023288138 A2 | 1/2023 |

\* cited by examiner

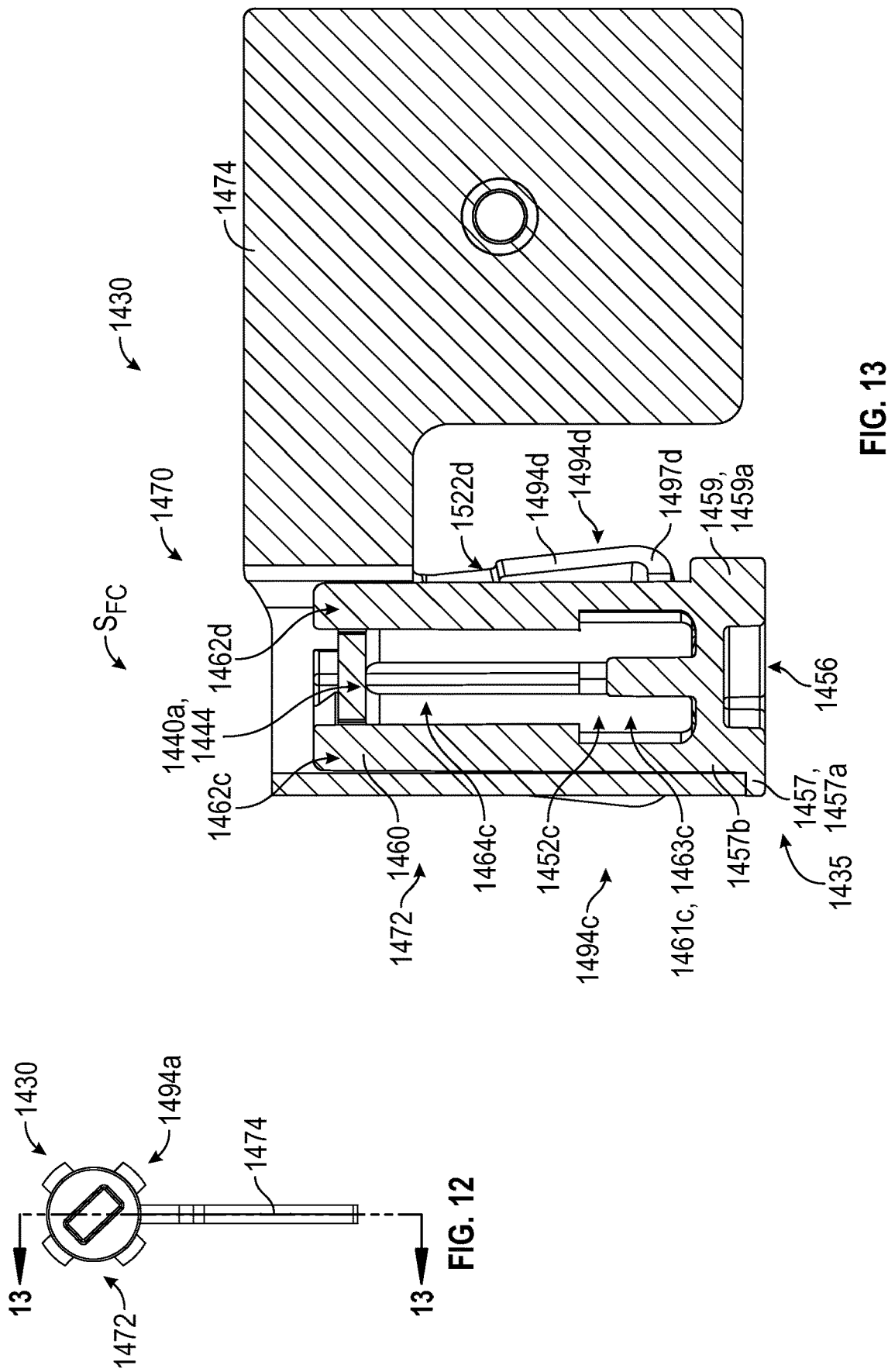

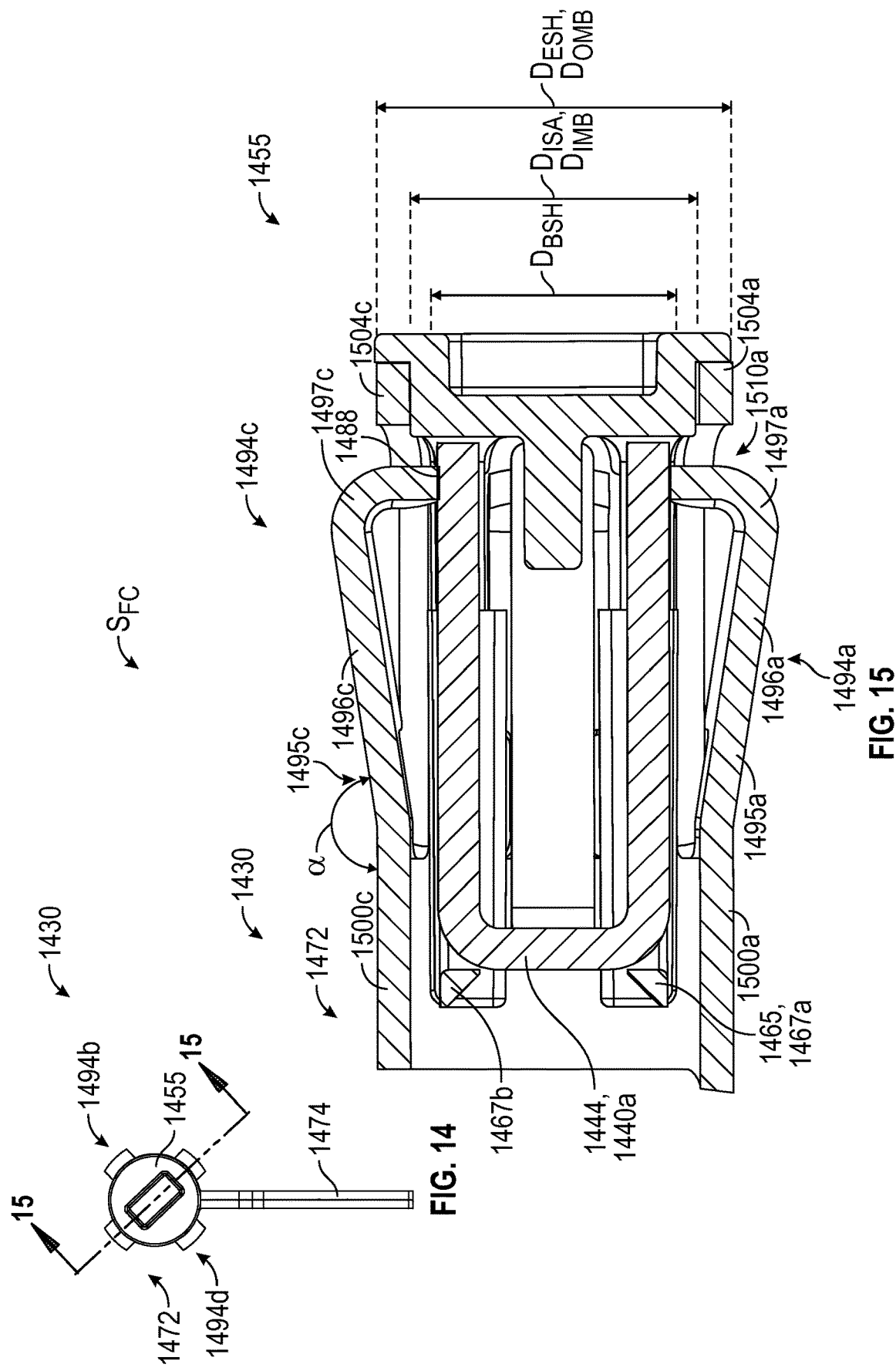

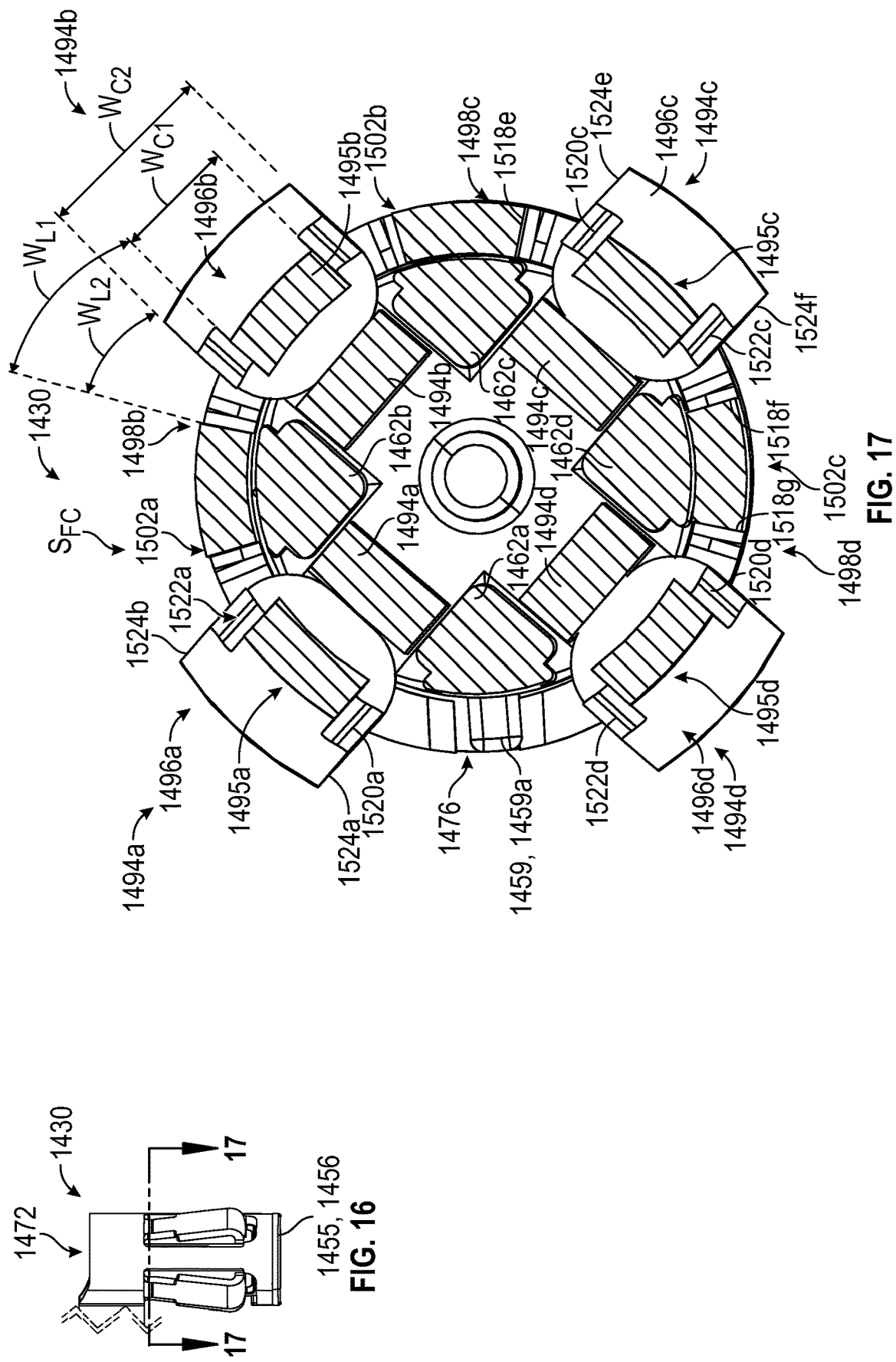

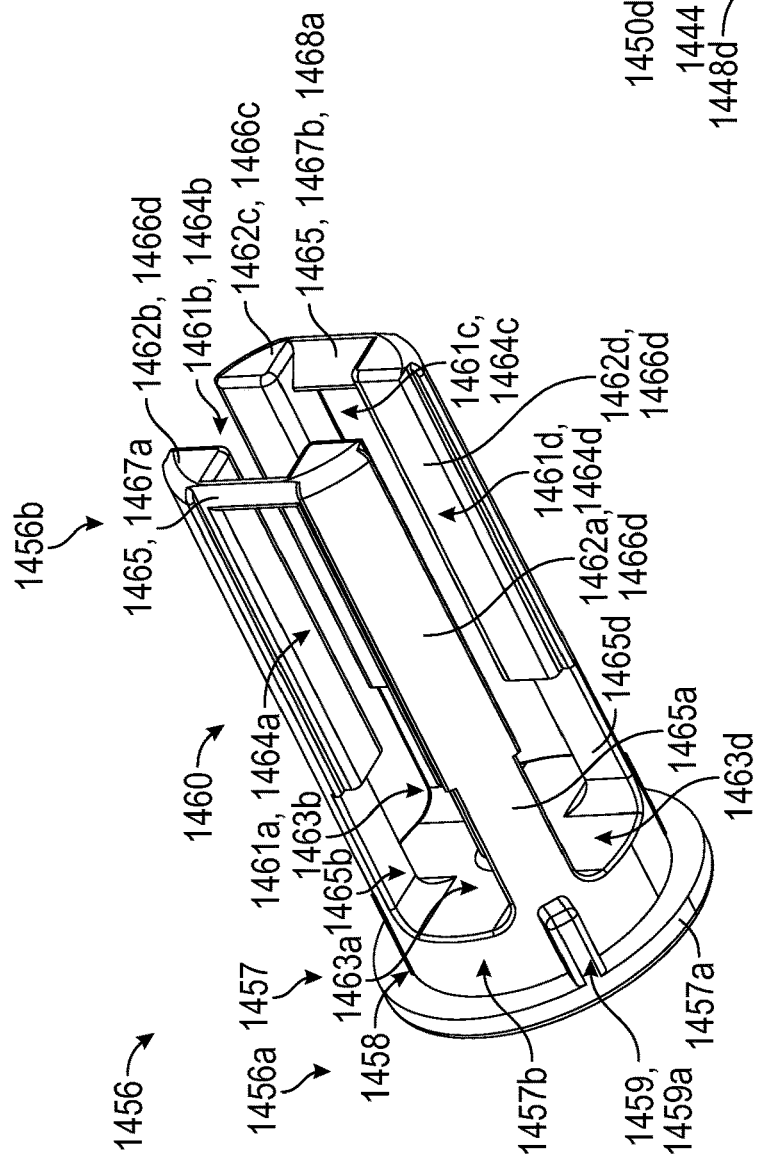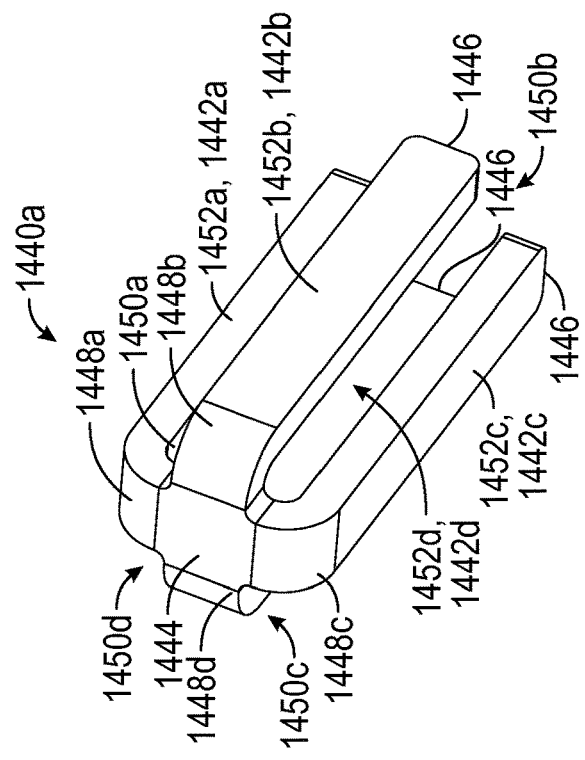
FIG. 21A
FIG. 21B

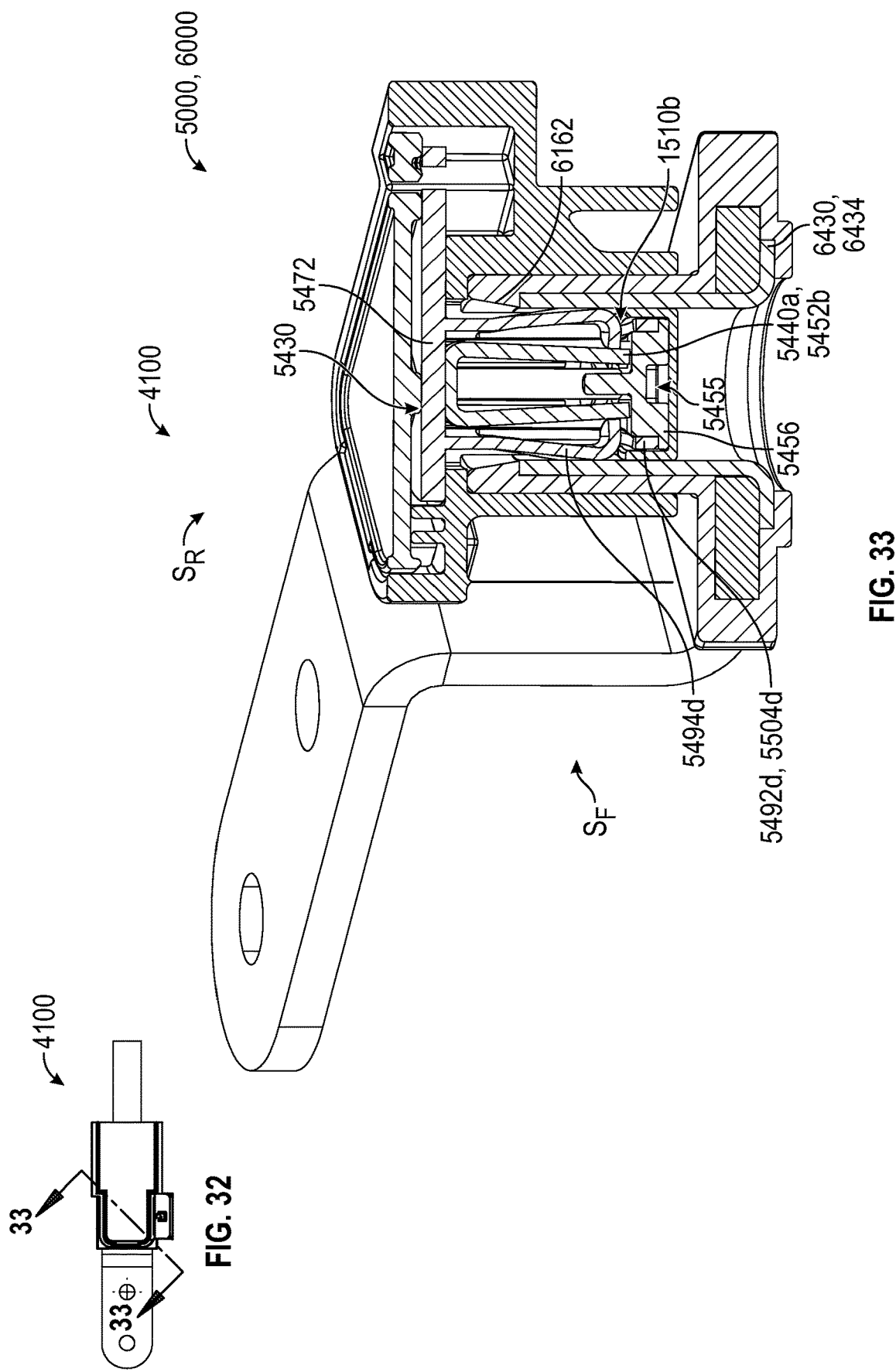

ELECTRICAL CONNECTOR SYSTEM WITH CYLINDRICAL TERMINAL BODY

RELATED APPLICATIONS

This application claims the benefit from PCT/US2021/043788, filed Jul. 29, 2021, which claims U.S. provisional patent application 63/058,061, filed Jul. 29, 2020, the disclosure of which are incorporated herein by this reference.

FIELD OF DISCLOSURE

The present disclosure relates to a connector system, more specifically a connector system including a cylindrical terminal body, and most specifically an electrical connector system including a cylindrical terminal body having an internal spring assembly.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creates comforts to the occupants of the motor vehicles. Considerable time, resources, and energy have been expended to develop power distribution components that meet the varied needs and complexities of the motor vehicle market; however, conventional power distribution components suffer from a variety of shortcomings.

Motor vehicles are challenging electrical environments for both the electrical components and the connector assemblies due to a number of conditions, including but not limited to, space constraints that make initial installation difficult, harsh operating conditions, large ambient temperature ranges, prolonged vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes leads to significant repair and warranty costs. For example, the combined annual accrual for warranty by all of the automotive manufacturers and their direct suppliers is estimated to be between $50 billion and $150 billion, worldwide. In light of these challenging electrical environments, considerable time, money, and energy have been expended to find power distribution components that meet the needs of the markets. This disclosure addresses the shortcomings of conventional power distribution components. A full discussion of the features and advantages of the present disclosure is deferred to the following detailed description, which proceeds with reference to the accompanying drawings.

SUMMARY

The present disclosure relates to a connector system for use in an airplane, motor vehicle, a military vehicle (e.g., tank, personnel carrier, heavy-duty truck, and troop transporter), a bus, a locomotive, a tractor, marine applications (e.g., cargo ship, tanker, pleasure boat, submarine and sailing yacht) telecommunications hardware (e.g., server), a battery pack, a 24-48 volt system, for a high-power application, for a high-current application, for a high-voltage application.

The invention that is discussed herein is a connector system, which can be used to electrically connect a power source to other power distribution components or assemblies. This connector system includes a male connector assembly with a male terminal assembly having a male terminal body. The male terminal body includes contact arms having irregular outer periphery, which is configured to reduce the insertion force associated with the male terminal body. This connector system also includes an innovative spring assembly that includes a spring member and a spring holder that ensures proper relative positioning of the components of the connector system, including the spring member and the male terminal. The connector system also includes a female connector assembly with a female terminal assembly that receives the male terminal assembly and the spring assembly, as discussed below.

In one embodiment of the electrical connector assembly for using in a power distribution assembly, the connector assembly includes an electrically conductive male terminal body having side wall defining a spring receiver. The side wall has a substantially cylindrical configuration and includes a first contact arm and a contact arm opening. The first contact arm having: (a) a first lateral edge, (b) a second lateral edge, (c) a first extent coupled to the side wall and having a first width that extends between the first and second lateral edges, and (d) a second extent coupled to the first extent of the contact arm and having a second width that extends between the first and second lateral edges, wherein the second width is greater than the first width. The contact arm opening having: (a) a first internal edge, (b) a second internal edge, (c) a first lateral extent extending between the first edge of the contact arm and a first internal edge and having a first width, (d) a second lateral extent extending between the first edge of the contact arm and a first internal edge and having a second width, and (e) wherein the first width and second width vary along the first and second lateral extents. The connector assembly also includes an internal spring member dimensioned to reside within the spring receiver of the male terminal body and having a first spring arm that is configured to underlie the first contact arm.

In another embodiment of the electrical connector assembly for using in a power distribution assembly, the connector assembly includes an electrically conductive male terminal body having: (i) a spring receiver, (ii) alignment receptacle, and (iii) a substantially cylindrical configuration. The connector assembly further includes an internal spring assembly having: (i) an internal spring member having a first spring arm and (ii) a spring holder dimensioned to reside within the spring receiver. Wherein the spring holder has: (a) an alignment mechanism configured to be positioned within the alignment receptacle in a joined state $J_S$, and wherein the alignment mechanism and alignment receptacle function together in order to properly align the internal spring member within the male terminal body and (b) a rear portion configured to receive and retain the internal spring member within the spring holder.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 12 is a bottom view of the male terminal assembly of FIG. 8;

FIG. 13 is a cross-sectional view of the male terminal assembly taken along line 13-13 of FIG. 12;

FIG. 14 is a bottom view of the male terminal assembly of FIG. 8;

FIG. 15 is a cross-sectional view of the male terminal assembly taken along line 15-15 of FIG. 14;

FIG. 16 is a partial side view of the male terminal assembly of FIG. 8;

FIG. 17 is a cross-sectional view of the male terminal assembly taken along the 17-17 line of FIG. 16;

FIG. 21A is a perspective view of the spring holder of FIG. 18;

FIG. 21B is a perspective view of the spring member of FIG. 18;

FIG. 32 is a top view of the connector system of FIG. 29;

FIG. 33 is a cross-sectional view of the connector system taken along line 33-33 of FIG. 32;

DETAILED DESCRIPTION

Figure 1:
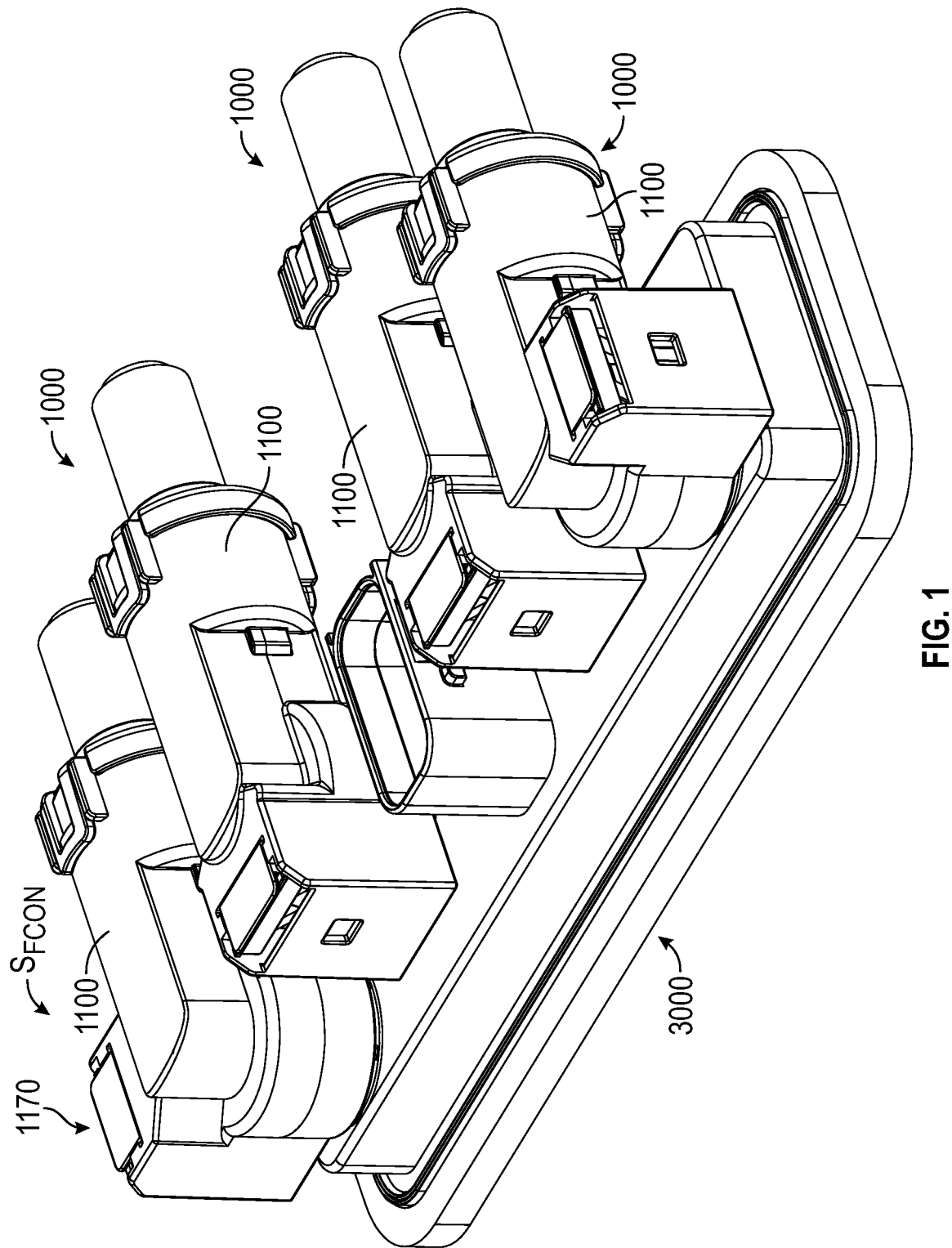
FIG. 1 is a perspective view of a component interface having a plurality of connector systems coupled thereto, each connector system including a male connector assembly and a female connector assembly.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. Accordingly, the drawings and detailed descriptions are to be regarded as illustrative in nature, not restrictive or limiting.

The Figures show two embodiments of connector systems 100, 4100 which is designed to mechanically and electrically couple one device or component to another device or component within a power distribution system or environment. For example, a device or component may be a current supplying device or component (e.g., power source, such as an alternator or battery) and the other device or component may be current drawing device or component (e.g., radiator fan, heated seat, power distribution component, or another current drawing component). Said power distribution system or environment that includes the connector systems 100, 4100 may be installed within an airplane, motor vehicle, a military vehicle (e.g., tank, personnel carrier, heavy-duty truck, and troop transporter), a bus, a locomotive, a tractor, a boat, a submarine, a battery pack, a 24-48 volt system, for a high-power application, for a high-current application, for a high-voltage application.

Figure 22:
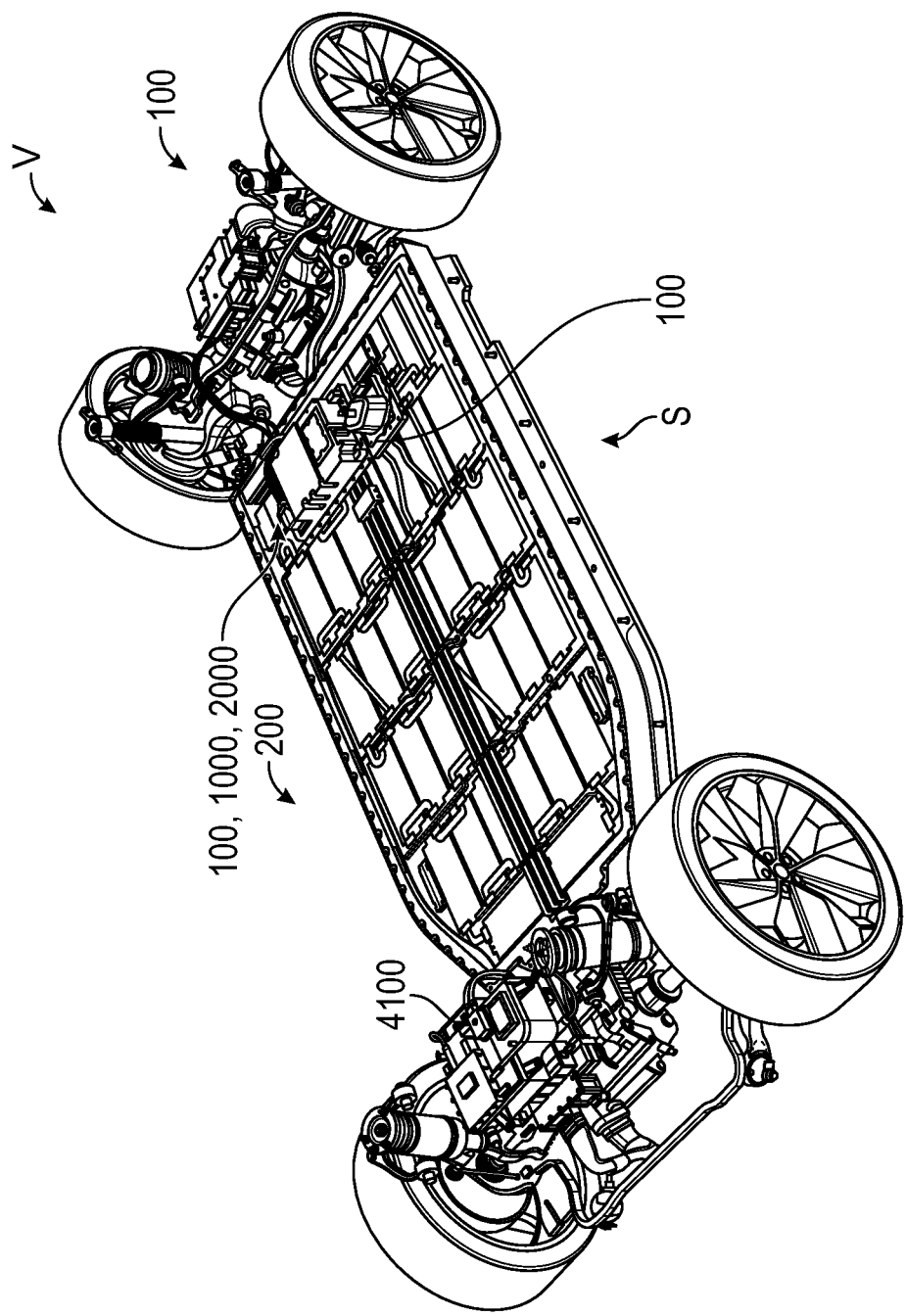
FIG. 22 is a perspective view of a vehicle skateboard chassis with a battery pack and wheels and tires, the vehicle skateboard including both the first and second embodiments of the connector system.
Figure 23:
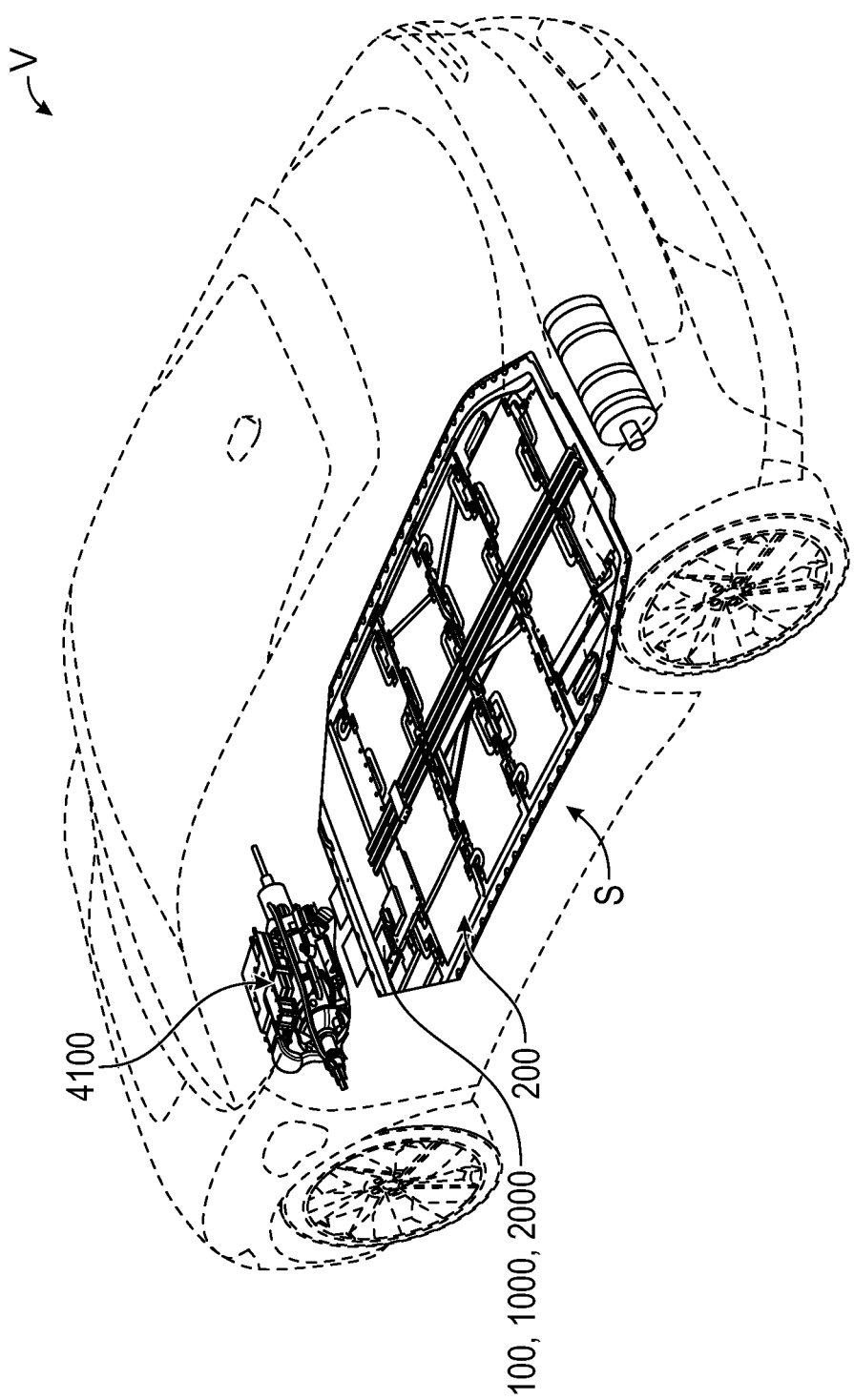
FIG. 23 is a perspective view of a motor vehicle having the skateboard chassis and battery pack of FIG. 22.
Figure 24:
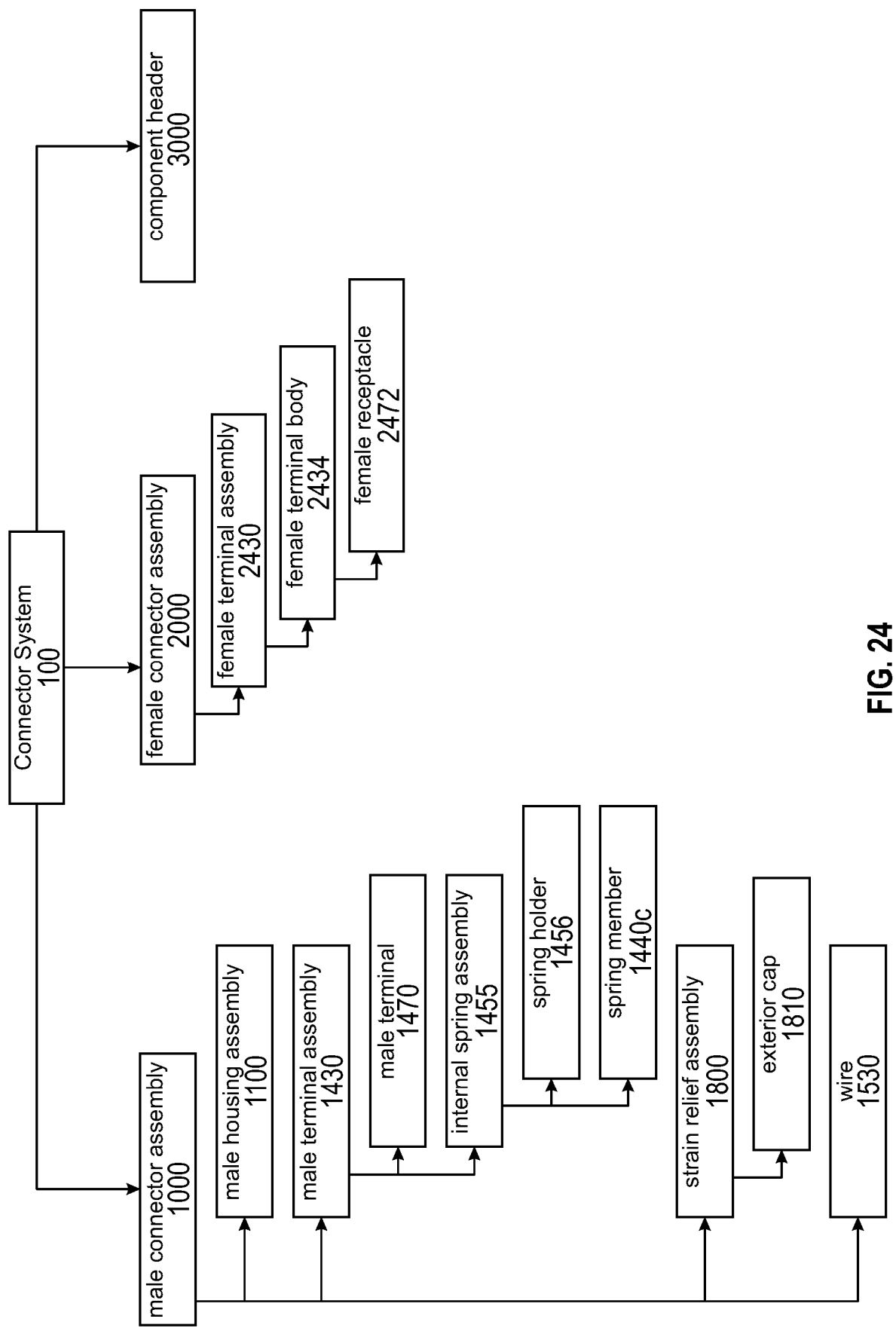
FIG. 24 is a block diagram showing components of the connector system.
Figure 25A:
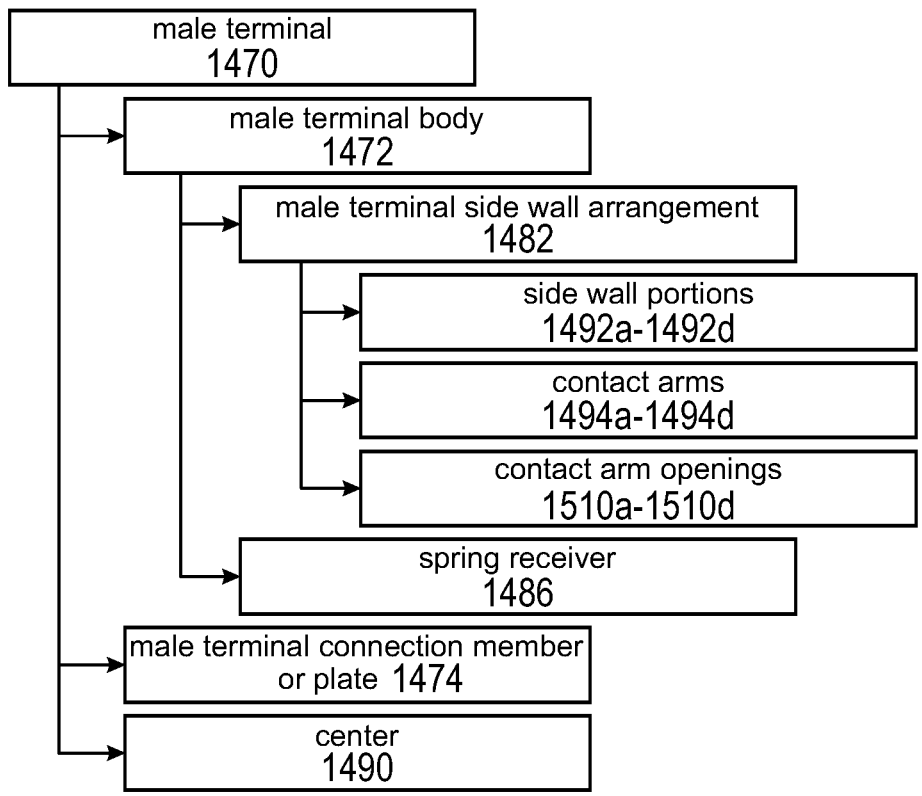
FIG. 25A is a block diagram showing components of the male terminal.
Figure 25B:
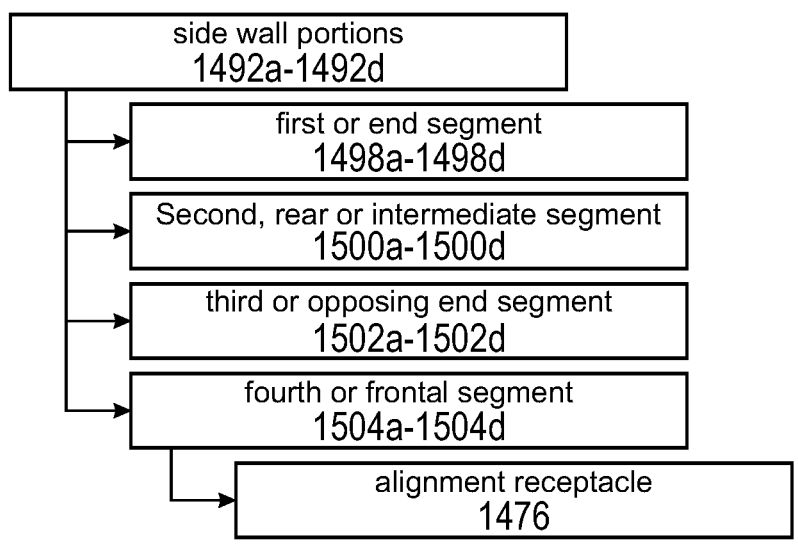
FIG. 25B is a block diagram showing components of the side wall portions of the male terminal.
Figure 25C:
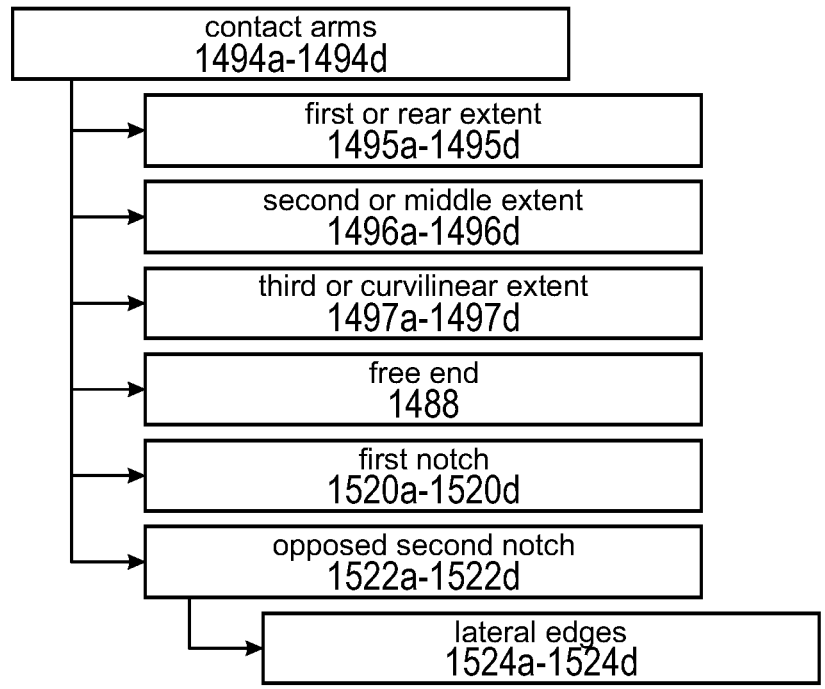
FIG. 25C is a block diagram showing components of the contact arms of the male terminal.
Figure 25D:
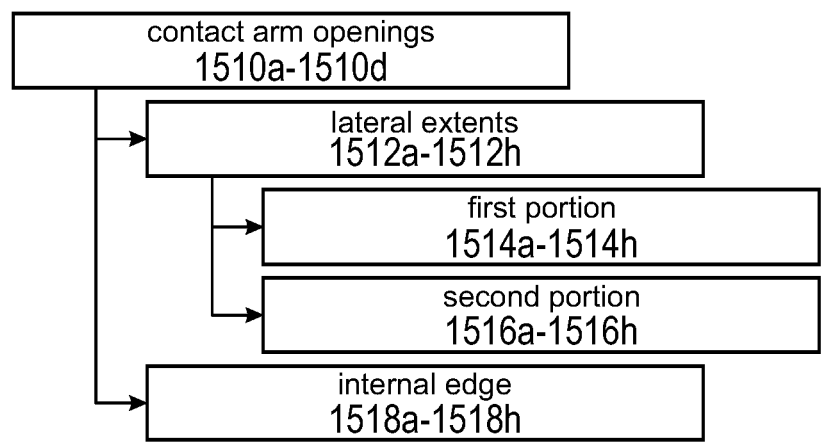
FIG. 25D is a block diagram showing components of the contact arm openings of the male terminal.
Figure 26:
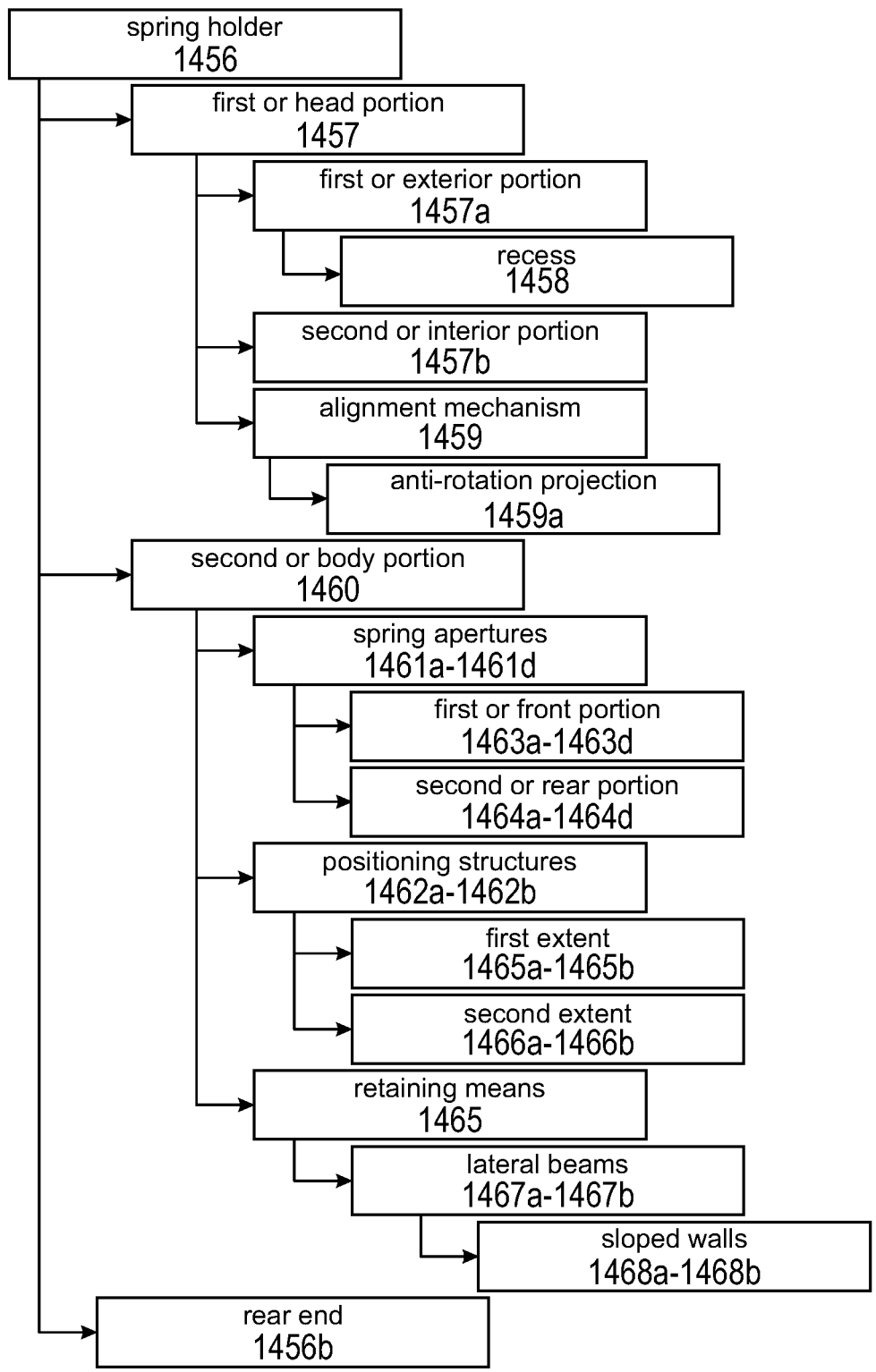
FIG. 26 is a block diagram showing components of the spring holder.
Figure 27:
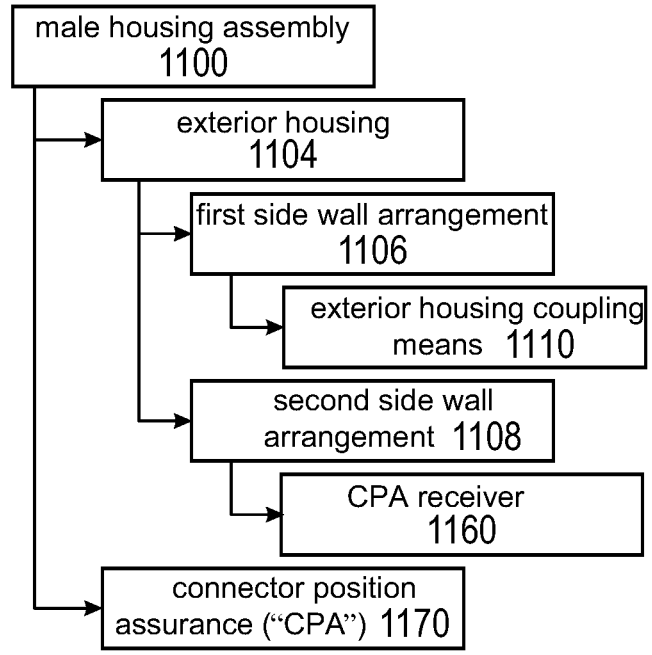
FIG. 27 is a block diagram showing components of the male housing; assembly.
Figure 28:
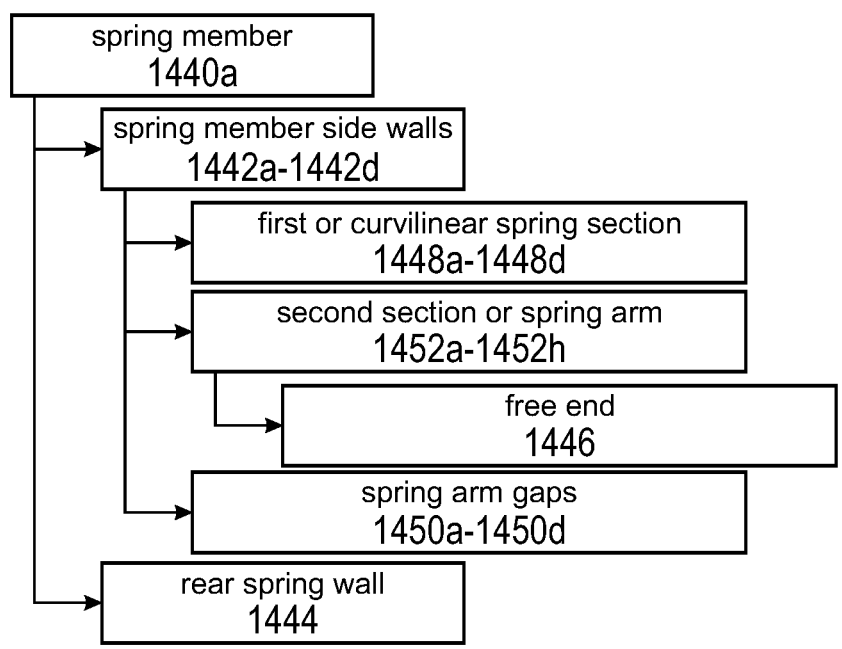
FIG. 28 is a block diagram showing components of the spring member.
Figure 30:
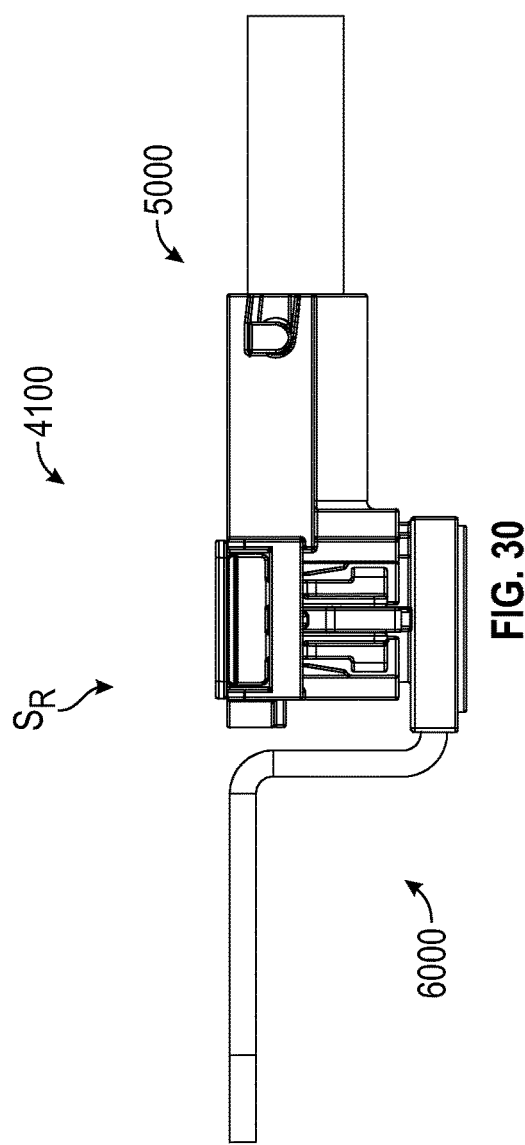
FIG. 30 is a side view of the connector system of FIG. 29.
Figure 29:
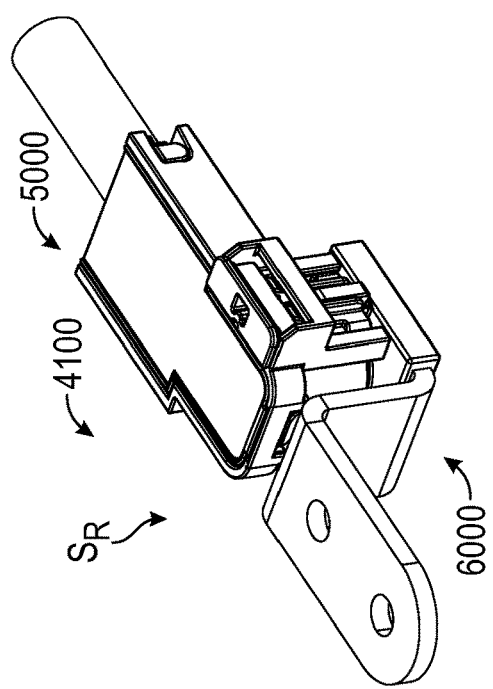
FIG. 29 is a perspective view of a second embodiment of a connector system, the connector system including a male connector assembly and a female connector assembly.
Figure 31:
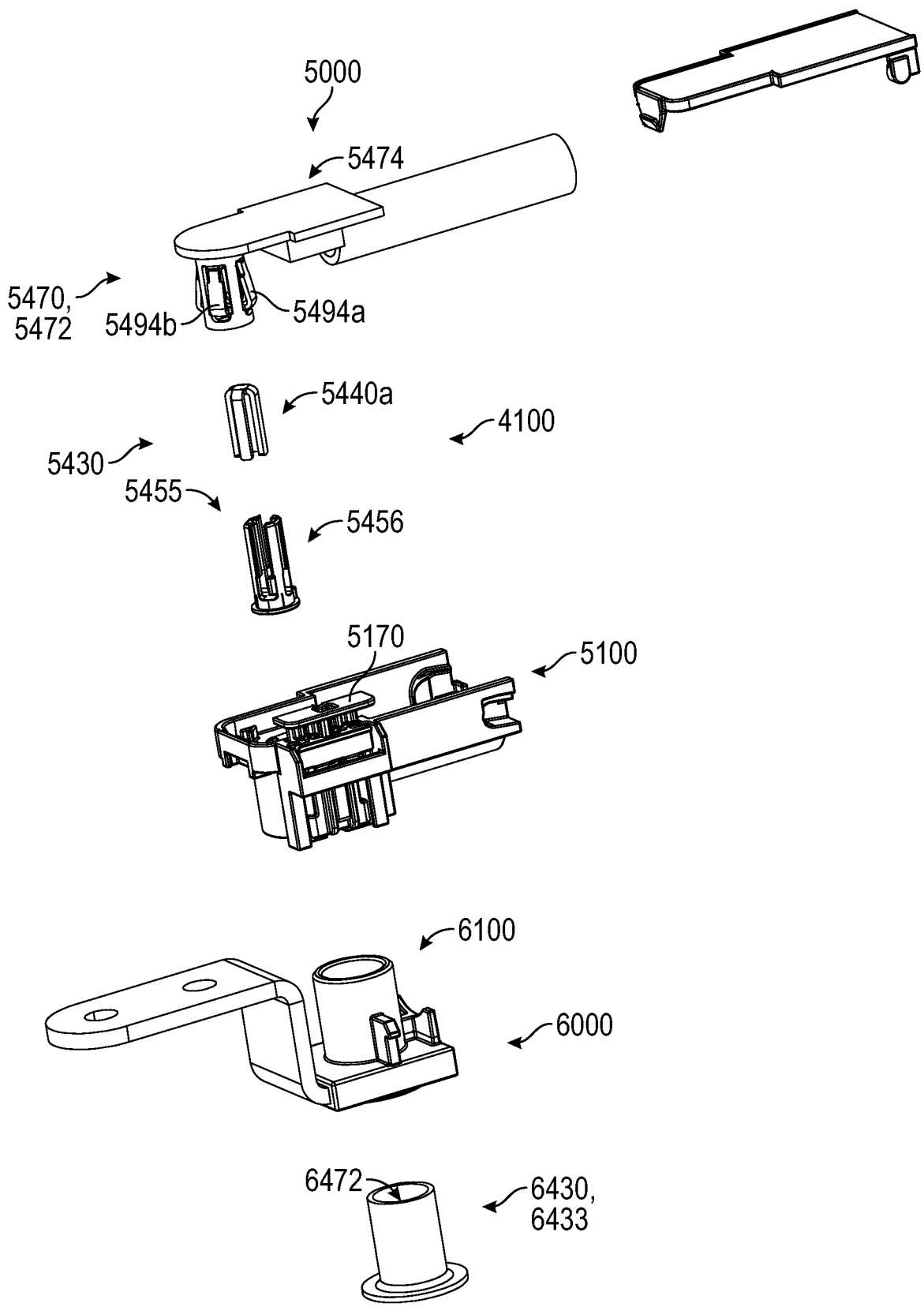
FIG. 31 is an exploded view of the connector system of FIG. 29, showing the male connector assembly and the female connector assembly.

An exemplary application of the connector system 100, 4100 is shown in FIGS. 28-29, wherein the connector system 100, 4100 is used in connection with a battery pack 200 installed in a vehicle skateboard S, wherein the vehicle skateboard S is installed in vehicle V. The battery pack 200 (see FIGS. 22-23) is configured to be positioned within the vehicle skateboard S (see FIG. 22), both of which are configured to be positioned within a motor vehicle V (see FIG. 23). In this and other applications, the power distribution components is essential to meet industry standards, production, and performance requirements of the power distribution system and the motor vehicle. It should be understood that multiple connector systems 100, 4100 could be used in a single application. Other embodiments, configurations, and uses for the connector system 100, 4100 is described within this application and are contemplated by this disclosure.

Figure 2:
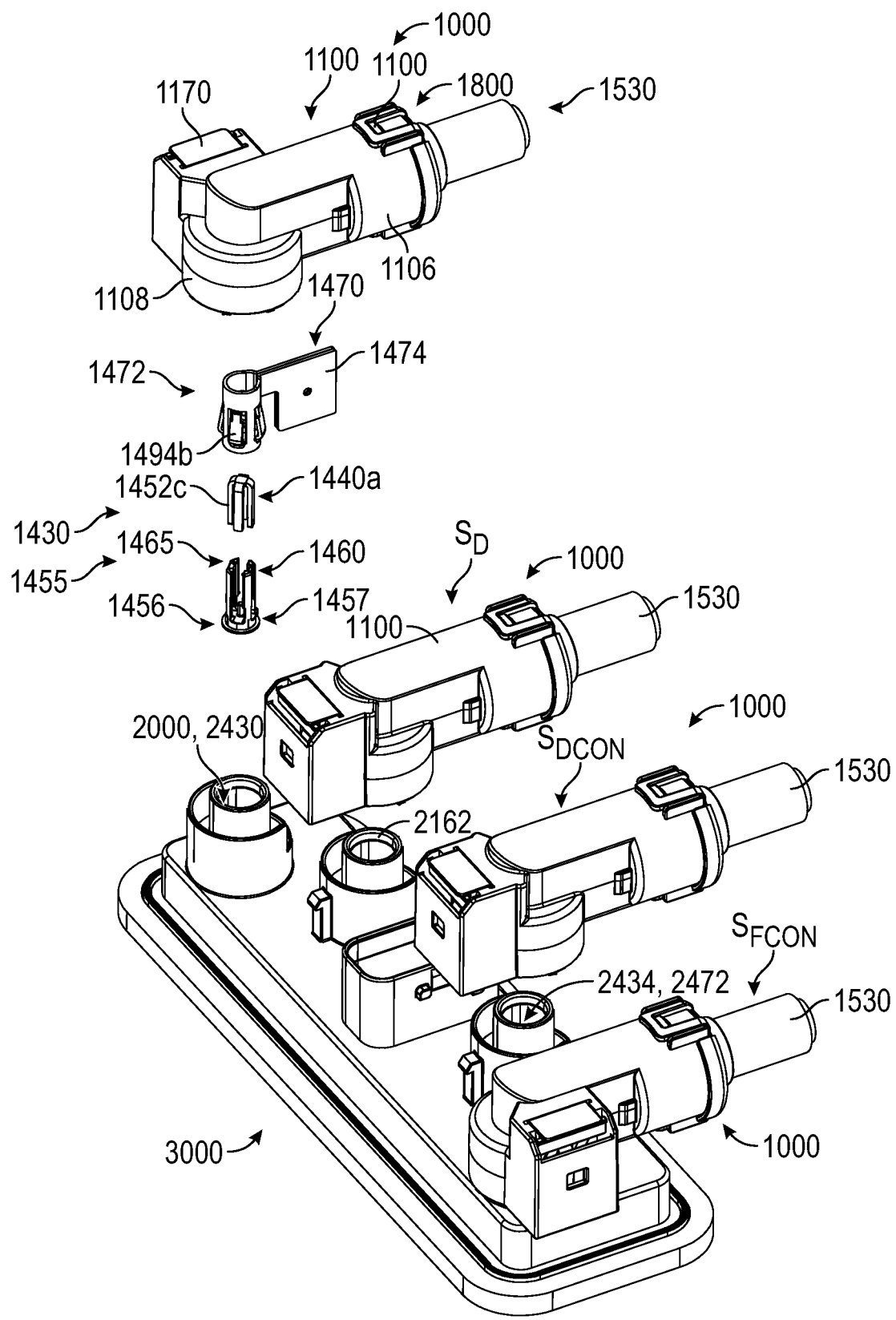
FIG. 2 is a perspective view of the component interface and connector systems of FIG. 1, showing: (i) one connector system in an exploded view, (ii) two connector systems in a disconnected state SD, where the male connector assembly is disconnected from the female connector assembly, and (iii) one connector system in a connected state Sc where the male connector assembly is connected to the female connector assembly, and where all of the female connector assemblies reside in the component interface.
Figure 4:
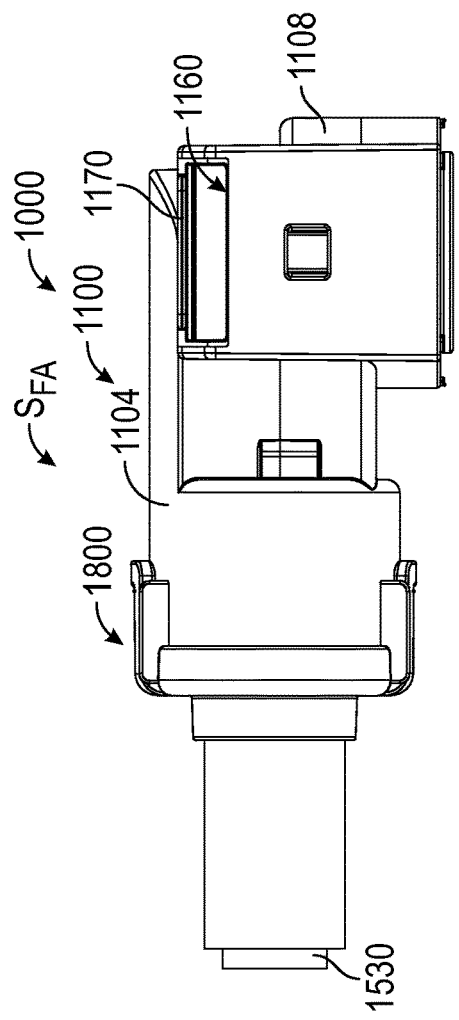
FIG. 4 is a side view of the male connector assembly of FIG. 3.
Figure 3:
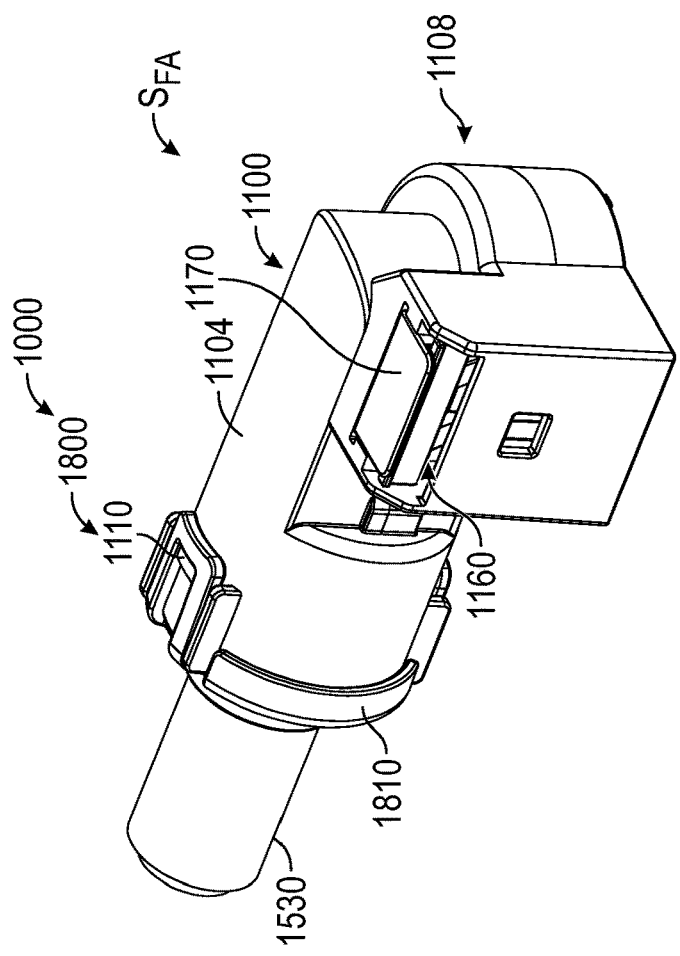
FIG. 3 is a perspective view of the male connector assembly of the connector system of FIG. 1, the male connector assembly being in a fully assembled state (SFA)
Figure 6:
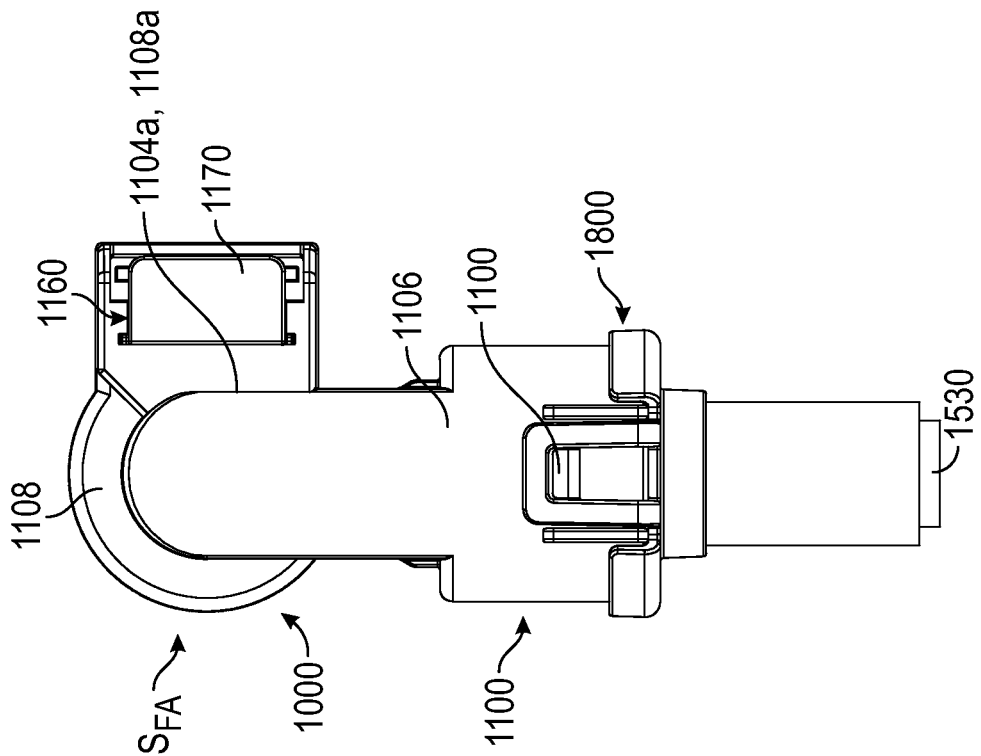
FIG. 6 is a top view of the male connector assembly of FIG. 3.
Figure 5:
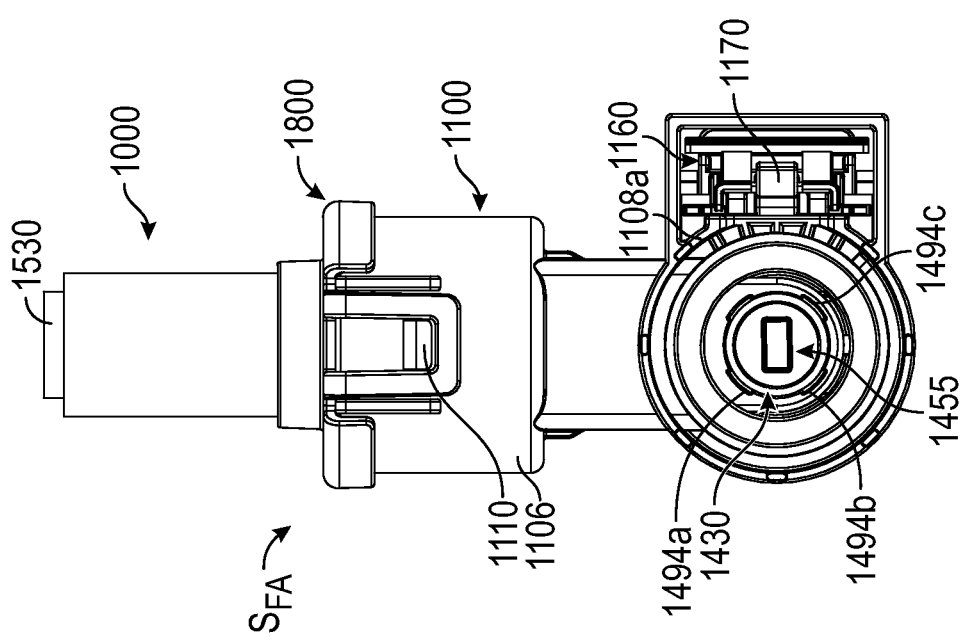
FIG. 5 is a bottom view of the male connector assembly of FIG. 3.

Various aspects of the first embodiment of the connector system 100 are disclosed herein. Specifically, the connector system 100 is comprised of: (i) a male connector assembly 1000, (ii) a female connector assembly 2000, and (iii) a component header 3000. FIGS. 1-20 show various views and components of the male connector assembly 1000. The male connector assembly 1000 is primarily composed of: (i) a male housing assembly 1100, (ii) a male terminal assembly 1430 having a male terminal body 1472 and an internal spring assembly 1455, and (iii) a strain relief assembly 1800. FIGS. 1-2 show various views and components of the female connector assembly 2000 and the component header 3000. The female connector assembly 2000 is primarily composed of a female terminal assembly 2430, while the component header 3000 is primarily composed of a female housing assembly 3100.

Various aspects of the first embodiment of the connector system 4100 are disclosed herein. Specifically, the connector system 4100 is comprised of: (i) a male connector assembly 5000 and (ii) a female connector assembly 6000. FIGS. 29-35 show various views and components of the male connector assembly 5000. The male connector assembly 5000 is primarily composed of: (i) an male housing assembly 5100, (ii) a male terminal assembly 5430, and (iii) a strain relief assembly 5800. FIGS. 29-35 show various views and components of the female connector assembly 6000. The female connector assembly 6000 is primarily composed of: (i) an female housing assembly 6100, and (ii) a female terminal assembly 6430.

First Embodiment

1) Male Connector Assembly

The male connector assembly 1000 is includes multiple components that are designed to be positioned external to a component or device (e.g., radiator fan, heated seat, power distribution component, or another current drawing component). The male connector assembly 1000 is primarily composed of: (i) the male housing assembly 1100, (ii) the male terminal assembly 1430, and (iii) the strain relief assembly 1800.

The male housing assembly 1100 encases or surrounds a substantial extent of the other components contained within the male connector assembly 1000. The male housing assembly 1100 generally includes: (i) an male housing 1104 and (ii) connector position assurance ("CPA") 1170. The male housing 1104 includes two arrangements of walls, wherein: (i) the first side wall arrangement 1106 has a tubular configuration and is designed to receive an extent of the wire 1530 and (ii) the second side wall arrangement 1108 has a tubular configuration and is designed to receive a substantial extent of the male terminal assembly 1430. The first arrangement of side walls 1106 includes a male housing coupling means 1110 that is designed to interact with an exterior cap 1810 that will be discussed below and is a part of the strain relief assembly 1800. The second arrangement of walls 1108 includes a CPA receiver 1160 that extends from the side walls 1104*a*, 1108*a*, and is designed to receive an extent of the CPA 1170. The two wall arrangements are typically formed from an insulating material that is designed to isolate the electrical current that flows through the male connector assembly 1000 from other components. Said CPA 1170 is generally designed to enable the connector system 100 to meet USCAR Specifications, including USCAR-12, USCAR-25, and USCAR-2. Additional details about the male housing assembly 1100, including the CPA 1170, are described within PCT/US2019/36070 and PCT/US20/49870, both of which are incorporated herein by reference.

In other embodiments, the housing assembly 1100 may be designed in a manner that permits mating from any direction. In other words, the male connector assembly 1000 is not keyed in a manner that only allows the connector assembly 1000 to mate with the female terminal 2430 when the male connector assembly 1000 is in a specific orientation. In this alternative configuration, the CPA 1170 may be omitted or may have a different structural configuration to permit this type of mating between the components. Additionally, the housing assembly 1100 may be shielded, may have additional layers of non-conductive and/or conductive materials, and/or may have a larger footprint in order to accept multiple male terminal assemblies 1430.

FIGS. 2, 5, 7-20 provide various views of the male terminal assembly 1430. Referring specifically to the first embodiment, the male terminal assembly 1430 includes a spring member 1440*a* and a male terminal 1470. The male terminal 1470 includes a male terminal body 1472 and a male terminal connection member or plate 1474. Said male terminal body 1472 includes a male terminal side wall arrangement 1482 configured to provide a spring receiver 1486 that is designed to receive the internal spring member or male spring member 1440*a*. Referring to FIGS. 7, 9, 13, 15, 17, and 18-20, the internal spring assembly or spring assembly 1455 includes an internal spring holder or spring holder 1456 and an internal spring member or spring member 1440*a*. The spring holder 1456 is configured to: (i) receive and retain an extent of the spring member 1440*a*, (ii) secure the spring member 1440*a* within the male terminal body 1472 in a joined state $S_J$, (iii) help ensure that the spring member 1440*a* is properly positioned, aligned, and/or centered within the male terminal body 1472.

Referring to FIGS. 7, 9, 13, 15, 17, and 18-20, the spring holder 1456 is comprised of a first portion or head portion 1457 and a second portion or body portion 1460. The head portion 1457 includes: (i) a first or exterior portion 1457*a*, which is configured to be positioned outside or exterior to the male terminal body 1472, (ii) a second or interior portion 1457*b*, which is configured to be positioned within or interior to the male terminal body 1472, and (iii) an alignment mechanism or a poka-yoke 1459. Focusing first on the exterior portion 1457a, the diameter $D_{ESH}$ of said exterior portion 1457a is larger than the interior diameter $D_{IMB}$ of the male terminal body 1472, while the diameter $D_{ESH}$ of the exterior portion 1457a is approximately equal to the outer diameter $D_{OMB}$ of the male terminal body 1472. The diameter $D_{ESH}$ of the exterior portion 1457a: (i) prevents the holder 1456 from being inserted too far into the male terminal body 1472 due to the interaction between the exterior portion 1457a and a frontal extent of the male terminal body 1472, and (ii) helps prevent foreign objects from making contact with the male terminal 1430 because it is positioned in front of the male terminal body 1472. Additionally, it should be understood that the diameter $D_{ESH}$ of the exterior portion 1457a is preferably not larger than the outer diameter $D_{OMB}$ of the male terminal body 1472 because a larger diameter $D_{ESH}$ would likely prevent proper mating between the male terminal assembly 1430 and the female terminal assembly 2430.

Now focusing on the interior portion 1457b of the spring holder 1456, the diameter $D_{ISH}$ of said interior portion 1457a is less than or substantially equal to the interior diameter $D_{IMB}$ of the male terminal body 1472. This smaller diameter $D_{ISH}$ of the interior portion 1457b enables insertion of the holder 1456 within the male terminal body 1472. Additionally, the diameter $D_{ISH}$ of the interior portion 1457b is greater than the diameter $D_{BSH}$ of body portion 1460 of the holder 1456. This greater diameter allows an extent of the holder 1456 to fit snuggly within the terminal 1430, while utilizing a smaller diameter to help ensure that the holder 1456 does not interfere with the movement of the spring 1440a during operation of the connector system 100. It should be understood that other diameters and configurations of the holder 1456 are contemplated by this disclosure.

The configuration of the exterior portion 1457a and interior portion 1457b and their associated diameters $D_{ESH}$, $D_{ISH}$, form a recess 1458, which is configured to receive an extent of the male terminal body 1472, when the holder 1456 is coupled thereto in a fully coupled state. Positioned within said recess 1458 is the alignment mechanism 1459. The alignment mechanism 1459 is designed to ensure that the holder 1456 is properly positioned within the male terminal body 1472, whereby the proper positioning of the holder 1456 ensures that the spring member 1440a is properly positioned in the male terminal body 1472. Properly aligning the spring member 1440a within the male terminal body 1472, provides many advantages over terminals that do not have properly aligned spring members, wherein such advantages include: (i) ensuring that the spring member 1440a applies a proper biasing force on the male terminal body 1472 to provide a proper connection between the male terminal assembly 1430 and the female terminal assembly 2430, (ii) helps improve the durability and useable life of the terminal assemblies 1430, 2430, and (iii) other beneficial features that are disclosed herein or can be inferred by one of ordinary skill in the art from this disclosure.

In this embodiment, the alignment mechanism 1459 is an anti-rotation projection 1459a configured to be received by a receptacle 1476 formed in a frontal extent of the male terminal body 1472. The anti-rotation projection 1459a helps align or center the spring member 1440a by limiting the amount the spring member 1440a can rotate or be miss-positioned within the male terminal body 1472. It should be understood that in other embodiments the alignment mechanism 1459 may take other forms, such as: (i) projections that extend inward from an extent of the male terminal body 1472, (ii) projections that extend outward from the spring member 1440a and are received by recesses, detents, or openings in the male terminal body 1472, (iii) projections that extend inward towards the center of the connector from the contact arms 1494a-1494d, (iv) projections, tabs, grooves, recesses, or extents of other structures that are designed to help ensure that the spring member 1440a is aligned within the male terminal body 1472 and cannot rotate within the spring receiver 1486.

It should further be understood that instead of utilizing a mechanical based alignment mechanism 1459, the alignment mechanism 1459 may be force based, wherein such forces that may be utilized are magnetic forces or chemical forces. In this example, the holder 1456 may be welded to the male terminal body 1472. In contrast to a mechanical or force based alignment mechanism 1459, the alignment mechanism 1459 may be a method or process of forming the male terminal assembly 1430. For example, the alignment mechanism 1459 may not be a structure, but instead may simultaneous printing of the spring member 1440a within the male terminal body 1472 in a way that does not require assembly. In other words, the alignment mechanism 1459 may take many forms (e.g., mechanical based, force based, or process based) to achieve the purpose of aligning the spring member 1440a within the male terminal body 1472.

The second portion or body portion 1460 extends from the interior portion 1457b of the first or head portion 1456 and is integrally formed therewith. The body portion 1460 includes multiple features (e.g., apertures, members, and structures) that aid in the positioning and retention of the spring member 1440a. In particular, the body 1460 includes spring apertures 1461a-1461d that form the positioning structures 1462a-1462d. Said spring apertures 1461a-1461d are designed to receive at least an extent of the spring arms 1494a-1494d and preferably the entire spring arm 1494a-1494d, when the spring member 1440a is positioned within the spring holder 1455 to form a joined state $S_J$. As such, the spring apertures 1461a-1461d have a length and a width that is sufficient to receive at least an extent of the spring arms 1494a-1494d and preferably the entire spring arm 1494a-1494d. In other words, the length and width of the spring apertures 1461a-1461d are preferably greater than the length and width of the spring arms 1494a-1494d.

The spring apertures 1461a-1461d have a first or front portion 1463a-1463d and a second or rear portion 1464a-1464d. The front portion 1463a-1463d has a first width and extends rearward from the head portion 1457 of the holder 1456 and, while the second portion 1464a-1464d has a second width and extends rearward from the first portion 1463a-1463d to either: (i) the rear end 1456b of the holder 1456 or (ii) retaining means 1465. The first width associated with the first portion 1463a-1463d is larger than the second width associated with the second portion 1464a-1464d. In other words, the extent of the positioning structures 1462a-1462d that are positioned adjacent to the first portion 1463a-1463d are smaller than the positioning structures 1462a-1462d positioned adjacent to the second portion 1464a-1464d. This enlarged extent of the spring apertures 1461a-1461d or reduced extent of the positioning structures 1462a-1462d helps ensure that the holder 1456 does not interfere with omnidirectional contraction/expansion of the spring member 1440a during insertion and operation of the connector system 100. It should be understood that in other embodiments, changing width of the spring apertures 1461a-1461d may be omitted, inverted, or differentiation between the first and second portions may be increased or decreased.

The positioning structures 1462a-1462d are designed to align, position, and retain the spring member 1440a within the male terminal body 1472. The positioning structures 1462a-1462d extend along at least an extent of the spring arms 1494a-1494d and preferably the entire length of the spring arm 1494a-1494d. The positioning structures 1462a-1462d have a cross-sectional shape that is substantially triangular, wherein the outermost extent of the triangular shape is curvilinear. In other words, the positioning structures 1462a-1462d have two linear sides and one curvilinear side that connects the two linear sides. As described above, positioning structures 1462a-1462d that are formed by the spring apertures 1461a-1461d have: (i) a first extent 1465a-1465d that extends along the first portion 1463a-1463d of the spring apertures 1461a-1461d and (ii) a second extent 1466a-1466d that extends along the second portion 1464a-1464d of the spring apertures 1461a-1461d. The first extent 1465a-1465d has a first cross-sectional area and a first depth (extending from the outer surface towards the center of the holder 1456), while the second extent 1466a-1466d has a second cross-sectional area and a second depth. Both the first cross-sectional area and a first depth are smaller than the second cross-sectional area and a second depth. It should be understood that in other embodiments, changing cross-sectional area and a depth of the positioning structures 1462a-1462d may remain constant, have a larger variance, or have a smaller variance. It should also be understood that the cross-sectional shape of the positioning structures 1462a-1462d may be different then what is shown in the figures and/or may vary across the positioning structures 1462a-1462d.

The retaining means 1465 is designed and configured to retain the spring member 1440a within the holder 1456. In the embodiment shown in the figures, said retaining means 1465 are lateral beams 1467a-1467b that extent between the positioning structures 1462a-1462d. In particular, lateral beam 1467a is positioned near the rear end 1456b of the holder 1456 and extends between positioning structures 1462a-1462b and lateral beam 1467b is positioned near the rear end 1456b of the holder 1456 and extends between positioning structures 1462c-1462d. The rearmost surface of the lateral beams 1467a-1467b is sloped to aid in the coupling of the holder 1456 and spring member 1440a. Specifically, these sloped walls 1468a-1468b help center the spring member 1440a and force the first pair of positioning structures 1462a-1462b away from the second pair of positioning structures 1462c-1462d. As such, the user or assembler must simply apply a forwardly directed force on the spring member 1440a in order to temporarily deform the positioning structures 1462a-1462d in order to allow for insertion of the spring member 1440a. Once the spring member 1440a is positioned in the retainer 1456, the positioning structures 1462a-1462d can return to a normal or non-deformed position. In this non-deformed position, the lateral beams 1467a-1467b are positioned rearward of the spring member 1440a to retain the spring member 1440a within the holder 1456. It should be understood that uncoupling the spring member 1440a from the holder 1456 requires the user or installer to apply forces in opposite directions in order to deform the pairs of positioning structures 1462a-1462d further enough to allow for extraction of the spring member 1440a from the holder 1456. It should be understood that lateral beams are not coupled across each of the positioning structures 1462a-1462d (e.g., between 1462b and 1462c) because deforming the positioning structures 1462a-1462d to a necessary extent may be difficult, if not impossible.

It should be understood that in other embodiments the retaining means 1465 may take other forms, such as: (i) a locking rear wall, (ii) projections that extend from the spring member 1440a and are received by the holder 1456, (iii) opening in the spring member 1440a that receives an extent of the holder 1456, or (iv) any other way of retaining/coupling one structure to another structure, which may include the use of projections, tabs, grooves, recesses, or extents. It should further be understood that instead of utilizing a mechanical based retaining means 1465, the retaining means 1465 may be force based, wherein such forces that may be utilized are magnetic forces or chemical forces. In this example, the holder 1456 may be welded to the male terminal body 1472. In contrast to a mechanical or force based retaining means 1465, the retaining means 1465 may be a method or process of forming the male terminal assembly 1430. For example, the retaining means 1465 may not be a structure, but instead may simultaneous printing of the spring member 1440a within the holder 1456 in a way that does not require assembly. In other words, the retaining means 1465 may take many forms (e.g., mechanical based, force based, or process based) to achieve the purpose of securing the spring member 1440a to the holder 1456.

The spring member 1440a includes an arrangement of spring member side walls 1442a-1442d and a rear spring wall 1444. Each spring member side wall 1442a-1442d is comprised of: (i) a first or curvilinear spring section 1448a-1448d, and (iii) a second section or spring arm 1452a-1452d. The curvilinear spring section 1448a-1448d extend between the rear spring wall 1444 and the spring arm 1452a-1452d and position the spring arm 1452a-1452d substantially perpendicular to the rear spring wall 1444. In other words, the outer surface of the spring arm 1452a-1452d is substantially perpendicular to the outer surface of the rear spring wall 1444.

As shown in FIG. 21B, the spring arms 1452a-1452d extend from the first or curvilinear spring section 1448a-1448d of the spring member 1440a, away from the rear spring wall 1444, and terminate at a free end 1446. The spring arms 1452a-1452d are not connected to one another and thus spring arm gaps 1450a-1450d are formed between the spring arms 1452a-1452d of the spring member 1440a. The spring arm gaps 1450a-1450d aid in omnidirectional expansion of the spring arms 1452a-1452d, which facilitates the mechanical coupling between the male terminal 1470 and the female terminal assembly 2430.

The spring arms 1452a-1452d are generally planar and are positioned such that the outer surface of the spring arms 1452a-1452d is substantially perpendicular to the outer surface of the rear wall 1444. Unlike the spring arm 31 that is disclosed within FIGS. 4-8 of PCT/US2018/019787, the free end 1446 of the spring arms 1452a-1452d do not have a curvilinear component. Instead, the spring arms 1452a-1452d have a substantially planar outer surface. This configuration is beneficial because it ensures that the forces associated with the spring 1440a are applied substantially perpendicular to the free end 1488 of the male terminal body 1472. In contrast, the curvilinear components of the spring arm 31 are disclosed within FIGS. 4-8 of PCT/US2018/019787 do not apply a force in this manner.

The internal spring member 1440a is typically formed from a single piece of material (e.g., metal); thus, the spring member 1440a is a one-piece spring member 1440a or has integrally formed features. In particular, the following features are integrally formed: (i) the curvilinear spring section 1448a-1448d, and (ii) the spring arm 1452a-1452d. To integrally form these features, the spring member 1440a is typically formed using a die forming process. The die forming process mechanically forces the spring member 1440a into shape. As discussed in greater detail below and in PCT/US2019/036010, when the spring member 1440a is formed from a flat sheet of metal, installed within the male terminal 1472 and connected to the female receptacle 2472, and is subjected to elevated temperatures, the spring member 1440a applies an outwardly directed spring thermal force STF on the contact arms 1494a-1494d due in part to the fact that the spring member 1440a attempts to return to a flat sheet. However, it should be understood that other types of forming the spring member 1440a may be utilized, such as casting or using an additive manufacturing process (e.g., 3D printing). In other embodiments, the features of the spring member 1440a may not be formed from a one-piece or be integrally formed, but instead formed from separate pieces that are welded together.

In an alternative embodiment that is not shown, the spring member 1440a may include recesses and associated strengthening ribs. As discussed in PCT/US2019/036010, these changes to the configuration of the spring member 1440a alter the forces that are associated with the spring 1440a. In particular, the spring biasing force SBF is the amount of force that is applied by the spring member 1440a to resist the inward deflection of the free end 1446 of the spring member 1440a when the male terminal assembly 1430 is inserted within the female terminal assembly 2430. Specifically, this inward deflection occurs during the insertion of the male terminal assembly 1430 due to the fact that an extent of an outer surface of the male terminal body 1472 is slightly larger than the interior of the female receptacle 2472. Thus, when the male terminal assembly 1430 is inserted into the female terminal assembly 2430, the extent of the outer surface is forced towards the center 1490 of the male terminal 1470. This inward force on the outer surface displaces the free end 1446 of the spring member 1440a inward (i.e., towards the center 1490). The spring member 1440a resists this inward displacement by providing a spring biasing force $S_F$. In other embodiments, the spring arms 1452a-1452d may be coupled to other structures to restrict their omnidirectional expansion. The number and width of individual spring arms 1452a-1452d and openings may vary. In addition, the width of the individual spring arms 1452a-1452d is typically equal to one another; however, in other embodiments one of the spring arms 1452a-1452d may be wider than other spring arms.

FIGS. 8-17 show a male terminal 1470 that includes the male terminal body 1472 and a male terminal connection plate 1474. Specifically, the male terminal connection plate 1474 is coupled to the male terminal body 1472 and is configured to receive an extent of a structure (e.g., lead or wire) that connects the male terminal assembly 1430 to a device (e.g., an alternator) outside of the connector system 100. The wire 1530 is typically welded to the connection plate 1474; however, other methods (e.g., forming the wire 1530 as a part of the connection plate 1474) of connecting the wire 1530 to the connection plate 1474 are contemplated by this disclosure. For example, a crimping connection may be utilized instead of the disclosed welding process.

As shown in FIGS. 8-17, the terminal side wall arrangement 1482 provides the terminal body 1472 with a generally cylindrical terminal configuration. The male terminal side wall 1482 includes: (i) a side wall portions 1492a-1492d, (ii) contact arms 1494a-1494d, and (iii) a plurality of contact arm openings 1510a-1510d. As best shown in FIGS. 9-17, the side wall portions 1492a-1492d are substantially curvilinear and include four segments 1498, 1500, 1502, and 1504. In particular, the four segments are: (i) a first or end segment 1498a-1498d, (ii) a second, rear, or intermediate segment 1500a-1500d, (iii) a third or opposing end segment 1502a-1502d, and (iv) a fourth or front segment 1504a-1504d. The second, rear or intermediate segment 1500a-1500d and the fourth or front segment 1504a-1504d are both coupled: (i) the first or end segment 1498a-1498d and (ii) the third or opposing end segment 1502a-1502d. It should be understood that the inclusion of more or less segments and/or other configures of the side wall portions 1492a-1492d are contemplated by this disclosure.

Figure 10:
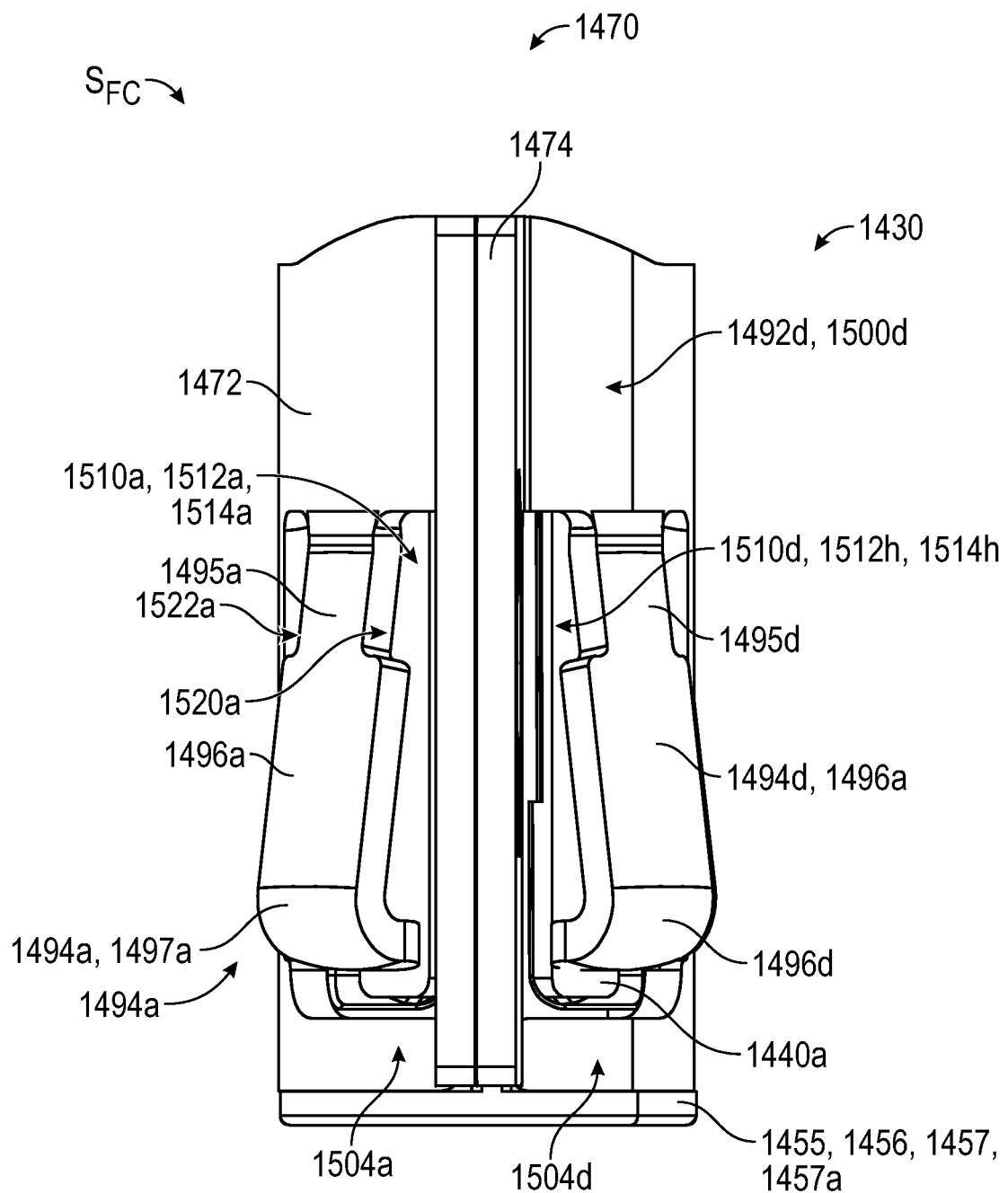
FIG. 10 is a rear view of the male terminal assembly of FIG. 8.
Figure 11:
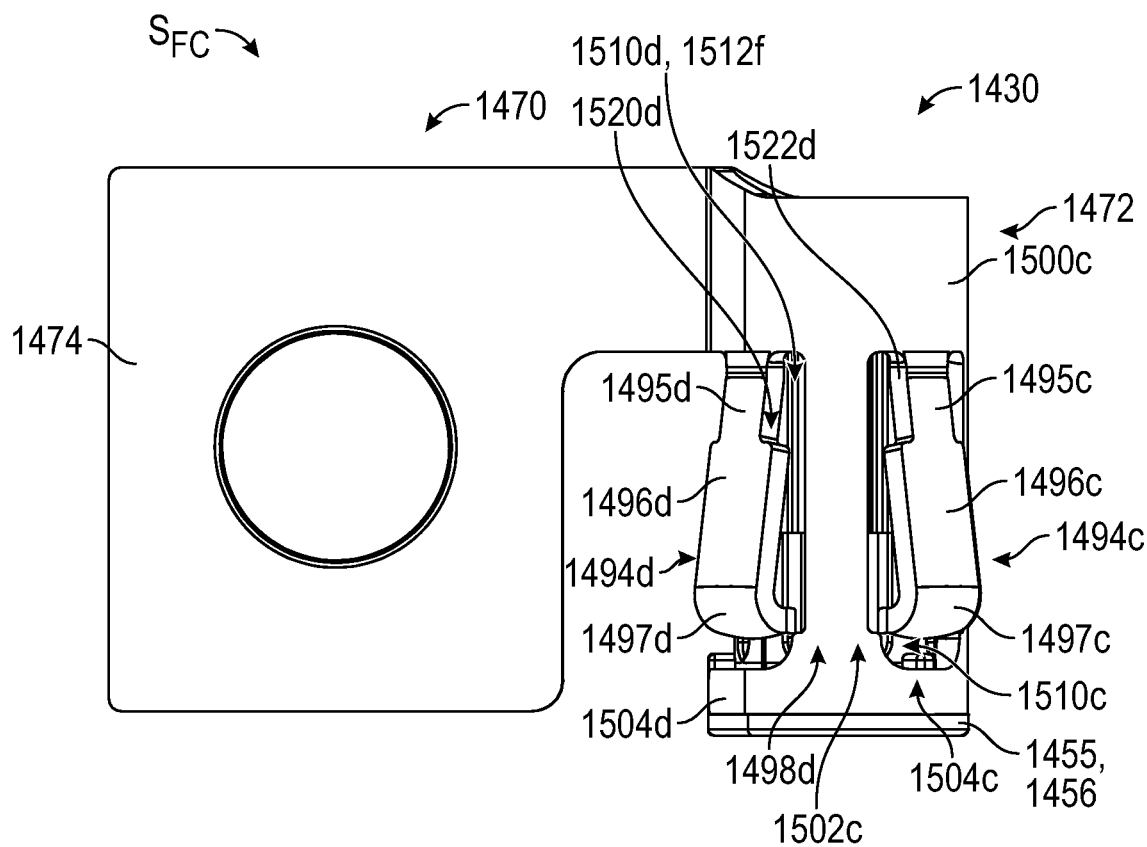
FIG. 11 is a side view of the male terminal assembly of FIG. 8.

The contact arm openings 1510a-1510d are integrally formed with the side wall portions 1492a-1492d, which in turn delineates the contact arms 1494a-1494d and the four segments 1498, 1500, 1502, 1504 of the side wall portions 1492a-1492d. In other words, the contact arm openings 1510a-1510d surround three sides of the contact arms 1494a-1494d in order to create a configuration that permits the contact arms 1494a-1494d not to be laterally connected to: (i) another contact arm 1494a-1494d or (ii) a structure other than the second, rear or intermediate segment 1500a-1500d to which the contact arms 1494a-1494d are coupled thereto. As best shown in FIGS. 10, 11 and 17, contact arm openings 1510a-1510d include lateral extents 1512a-1512h that extend along each elongated edge of the contact arms 1494a-1494d. For example, one contact arm opening 1510a includes: (i) a first lateral extent 1512a positioned between the contact arm 1494a and the first segment 1498a of the side wall portion 1492a and (ii) a second lateral extent 1512b positioned between the contact arm 1494a and the third segment 1502a of the side wall portion 1492a. In particular, the first lateral extent 1512a extends between a first lateral edge 1524a of the contact arm 1510a and a first internal edge 1518a of the contact arm opening 1510 and the second lateral extent 1512b extends between a second lateral edge 1524b of the contact arm 1510a and a second internal edge 1518b of the contact arm opening 1510.

In light of the above configuration, said lateral extents 1512a-1512h of the contact arm openings 1510a-1510d that extend along the contact arm 1494a-1494d do not have uniform widths. As such, said lateral extents 1512a-1512h are comprised of: (i) a first portion 1514a-1514h has a first lateral width Wu and is positioned adjacent to intermediate segment 1500a-1500d of the side wall portions 1492a-1492d and (ii) a second portion 1516a-1516h has a second lateral width WL2 and is positioned such that it abut the first portion 1514a-1514h and terminate at the frontal segment 1504a-1504d of the side wall portions 1492a-1492d. The first width which is associated with the first portion 1514a-1514h is different than the second width which is associated with the second portion 1516a-1516h. In particular, the first lateral width Wu is larger than the second lateral width WL2 in the embodiment displayed in the Figures. For example, the first width in the displayed embodiment is approximately 0.95 mm, where the second width is approximately 0.45 mm. With these varying widths, it should be understood that the first and second lateral edges 1524a, 1524b of the contact arm 1510a are not substantially linear. Additionally, an extent of the contact arm openings 1510a-1510d are aligned with the spring arm gaps 1450a-1450d, when the male terminal assembly 1430 is in the fully coupled state SFC. This configuration forms four spring arms 1452a-1452d and four contact arms 1494a-1494d. It should be understood that in other embodiments, the number of spring arms 1452a-1452d may not match the number of contact arms 1494a-1494d. For example, there may be fewer one spring arms 1452a-1452d.

As best shown in FIGS. 10-11 and 15, the contact arms 1494a-1494d extend: (i) from an extent of the intermediate segment 1500a-1500d of the side wall portion 1492a-1492d, (ii) across an extent of the contact arm openings 1510a-1510d, and (iii) terminate just short of the fourth or front segment 1504a-1504d. This configuration is beneficial over the configuration of the terminals shown in FIGS. 9-15, 18, 21-31, 32, 41-42, 45-46, 48 and 50 in PCT/US2018/019787 because it allows for: (i) can be shorter in overall length, which means less metal material is needed for formation and the male terminal 1470 can be installed in narrower, restrictive spaces, (ii) has a higher current carrying capacity, (iii) is easier to assemble, (iv) improved structural rigidity because the contact arms 1494a-1494d are positioned inside of the first male terminal side wall portion 1492a-1492d, (iv) benefits that are disclosed in connection with PCT/US2019/036010, and (v) other beneficial features that are disclosed herein or can be inferred by one of ordinary skill in the art from this disclosure.

As best shown in FIGS. 15 and 17, the contact arms 1494a-1494d includes: (i) a first or rear extent 1495a-1495d that extends from the second, rear or intermediate segment 1500a-1500d, (ii) a second or middle extent 1496a-1496d that extends between the first extent 1495a-1495d and a third extent 1497a-1497d, and (iii) the third or curvilinear extent 1497a-1497d that extends between the second extent 1496a-1496d and the free end 1488. Said extents 1495a-1495d, 1496a-1496d, and 1497a-1497d have non-uniform widths, wherein said widths include: (i) the first or rear extent 1495a-1495d has a first contact arm width $W_{C1}$ that extends between the first portion 1514a-1514h of the lateral extents 1512a-1512h of the contact arm openings 1510a-1510d, and (ii) the second and third extents 1496a-1496d, 1497a-1497d have a second contact arm width $W_{C2}$ that extends between the second portion 1516a-1516h of the lateral extents 1512a-1512h of the contact arm openings 1510a-1510d. As described above, the widths of the portions 1514a-1514h, 1516a-1516h vary and as such the widths of the contact arms 1494a-1494d vary.

In this embodiment, the first contact arm width $W_{C1}$ that extends from the first lateral edge 1524a to the second lateral edge 1524b and is associated with the first extent 1495a-1495d of the contact arm 1494a-1494d is less than the second contact arm width $W_{C2}$ that extends from the first lateral edge 1524a to the second lateral edge 1524b and is associated with the second and third extents 1496a-1496d, 1497a-1497d of the contact arm 1494a-1494d. This reduction in the width of the first extent 1495a-1495d forms a contact arm 1494a-1494d with an irregular outer periphery, wherein a first notch 1520a-1520d and an opposed second notch 1522a-1522d are formed in the contact arm 1494a-1494d and extend along the length of the first extent 1495a-1494d of the contact arm 1494a-1494d. The first width in one embodiment is approximately 1.9 mm, where the second width is approximately 2.9 mm. Thus, each notch 1520a-1520d, 1522a-1522d has a width that is approximately 0.5 mm. It should be understood that in other embodiment: (i) the width of the curvilinear extent 1497a-1497d may not be equal to the width of the middle extent 1496a-1496d, (ii) the variability in the widths of the extents 1495a-1495d, 1496a-1496d, 1497a-1497d may be greater or less, (iii) there may be additional extents with additional differing widths (e.g., 10 extents, wherein each extent has a different width), (iv) the number, depth, or configuration of notches 1520a-1520d, 1522a-1522d may not be equal for each contact arm 1494a-1494d, (v) the widths of each of the extents may be substantially equal.

The smaller first width of the contact arm 1494a-1494d, namely—the rear extent 1495a-1495d of the contact arm 1494a-1494d—reduces the force that is required to deflected or displaced the contact arm 1494a-1494d inward and towards the center 1490 of the male terminal 1470 when coupling the male terminal assembly 1430 to the female terminal assembly 2430. This is beneficial because it reduces the insertion force that is associated with the male terminal body 1472 and increase the insertion force that is associated with the internal spring member 1440a in order to maintain the same combined insertion force level. In other words, the disclosed connector system 100 utilizes the same insertion force requirements that would be associated with a similar connector system that includes a contact arm that has linear edges. However, the forces associated with the components that contribute to the insertion force have been reallocated to place a heaver reliance on the spring member 1440a and less reliance on the male terminal body 1472. This heavier reliance on the internal spring member 1440a is beneficial because the designer can easily change the properties of the connector system without requiring alterations to the terminal body 1472. For example, the designer can insert a stiffer spring member 1440a within the spring receiver 1486 in order to increase the current capacity of the system 100. Or if there are specific customer requirements setting forth a target insertion force, the designer can simply select a spring member 1440a that meets these requirements without the need to redesign the male terminal body 1472. This modularity and flexibility of the connector system 100 is a substantial improvement over the prior art, as reduce the number of product skus, increases the ability to meet customer requirements without retooling or redesigning the connector, and/or limits testing and other steps that would be required to utilize new/different connectors. For these reasons and additional reasons that would be obvious to one of skill in the art based on this disclosure, the connector system 100, and specifically the male terminal assembly 1430, provide substantial advantages over the male terminal assembly 430 shown and disclosed within PCT/US19/36010.

The contact arms 1494a-1494d extend away from a forward extent of the second, rear or intermediate segment 1500a-1500d at an outward angle. In particular, the outward angle alpha, which may be between 179.9 degree and 172 degrees between the outer surface of the extent of the male terminal side wall 1492a-1492d and the outer surface of the first extent of the contact arms 1494a-1494d, preferably between 6 degrees and 12 degrees and most preferably between 8 degrees and 10 degrees. This outward angle is shown in multiple figures, but may be best visualized in connection with FIG. 15. This configuration allows the contact arms 1494a-1494d to be deflected or displaced inward and towards the center 1490 of the male terminal 1470 by the female receptacle 2472, when the male terminal assembly 1430 is inserted into the female terminal assembly 2430. This inward deflection is best shown in FIG. 25. This inward deflection helps ensure that a proper mechanical and electrical connection is created by ensuring that the contact arms 1494a-1494d are placed in contact with the female receptacle 2472.

As shown in FIGS. 10-11 and 15, the terminal ends of the contact arms 1494a-1494d are positioned: (i) within the contact arm openings 1510a-1510d, (ii) substantially parallel to the male terminal side wall 1492a-1492d, and (iii) in contact the planar outer surface of the spring arms 1452a-1452d, when the spring member 1440a is inserted into the spring receiver 1486. This configuration is beneficial over the configuration shown in FIGS. 3-8 in PCT/US2018/019787 because the assembler of the male terminal assembly 1430 does not have to apply a significant force in order to deform a majority of the contact arms 1494a-1494d outward to accept the spring member 1440a. This required deformation can best be shown in FIG. 6 of PCT/US2018/019787 due to the slope of the contact arm 11 and the fact the outer surface of the spring arm 31 and the inner surface of the contact arm 11 are adjacent to one another without a gap formed therebetween. In contrast to FIGS. 3-8 in PCT/US2018/019787, FIG. 7 of the present application show a very small gap that is formed between the outer surfaces of the spring member 1440a and the inner surface of the contact arms 1494a-1494d. Accordingly, very little force is required to insert the spring member 1440a into the spring receiver 1486 due to the fact the assembler does not have to force the contact arms 1494a-1494d to significantly deform during the insertion of the spring 1440a.

The male terminal 1470 is typically formed from a single piece of material (e.g., metal); thus, the male terminal 1470 is a one-piece male terminal 1470 and has integrally formed features. To integrally form these features, the male terminal 1470 is typically formed using a die-cutting process. However, it should be understood that other types of forming the male terminal 1470 may be utilized, such as casting or using an additive manufacturing process (e.g., 3D printing). In other embodiments, the features of the male terminal 1470 may not be formed from a one-piece or be integrally formed, but instead formed from separate pieces that are welded together. In forming the male terminal 1470, it should be understood that any number (e.g., between 1 and 100) of contact arms 1494a-1494d may be formed within the male terminal 1470.

Figure 7:
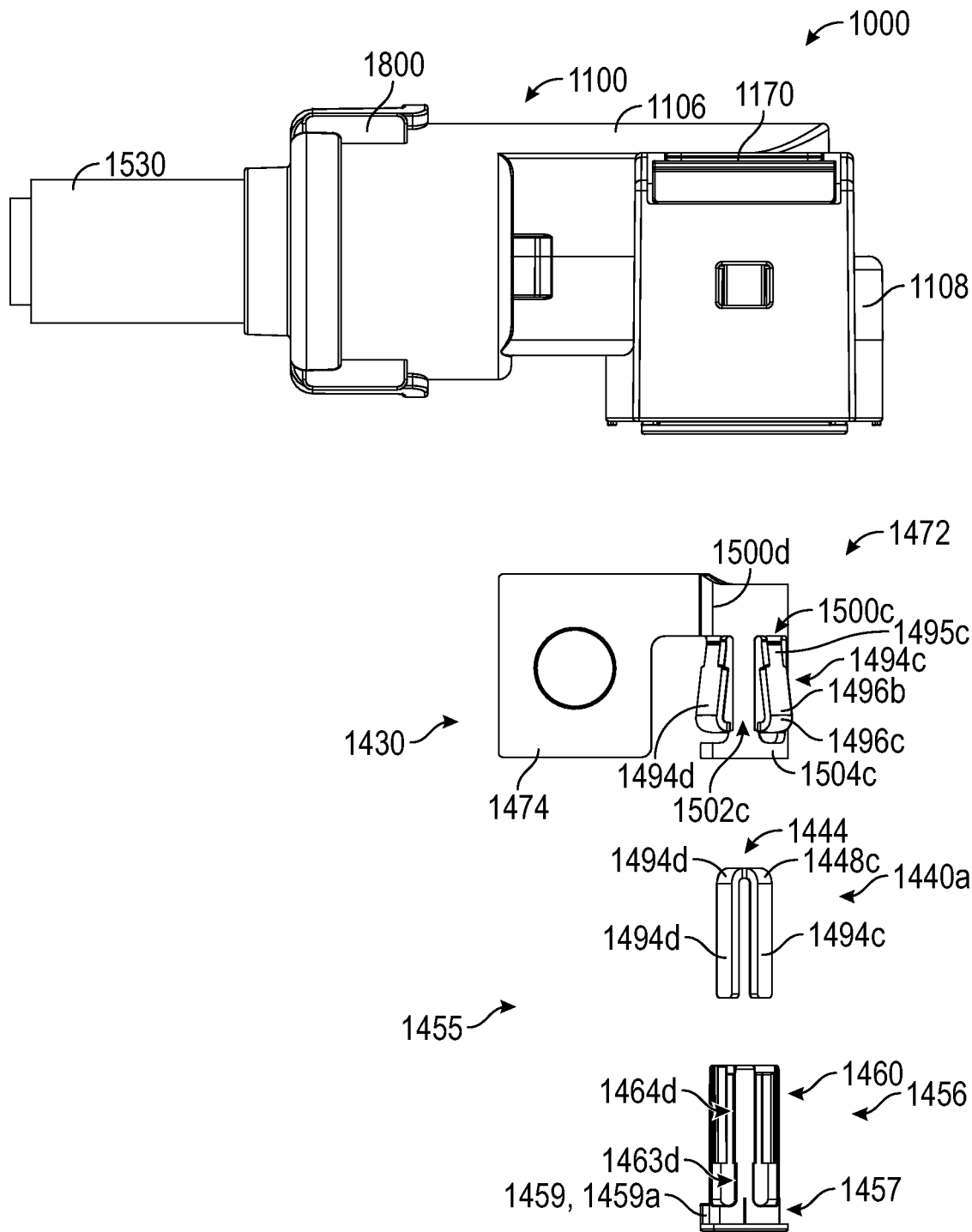
FIG. 7 is an exploded view of the male connector assembly of FIG. 3, the male connector assembly having a male housing and a male terminal assembly.
Figure 8:
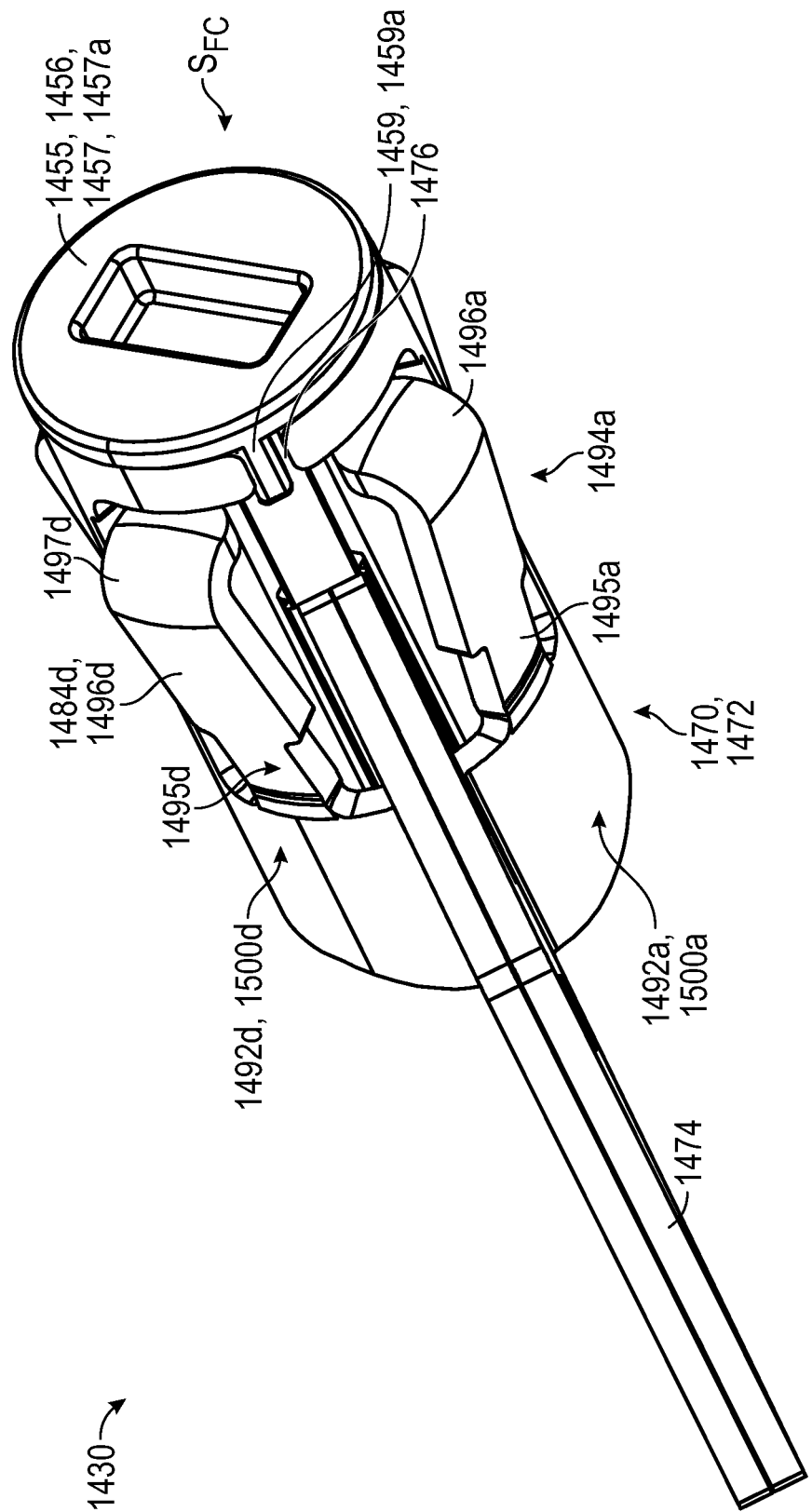
FIG. 8 is a perspective view of the male terminal assembly of the male connector assembly of FIG. 3, showing the male terminal assembly in a fully coupled state SFC.
Figure 9:
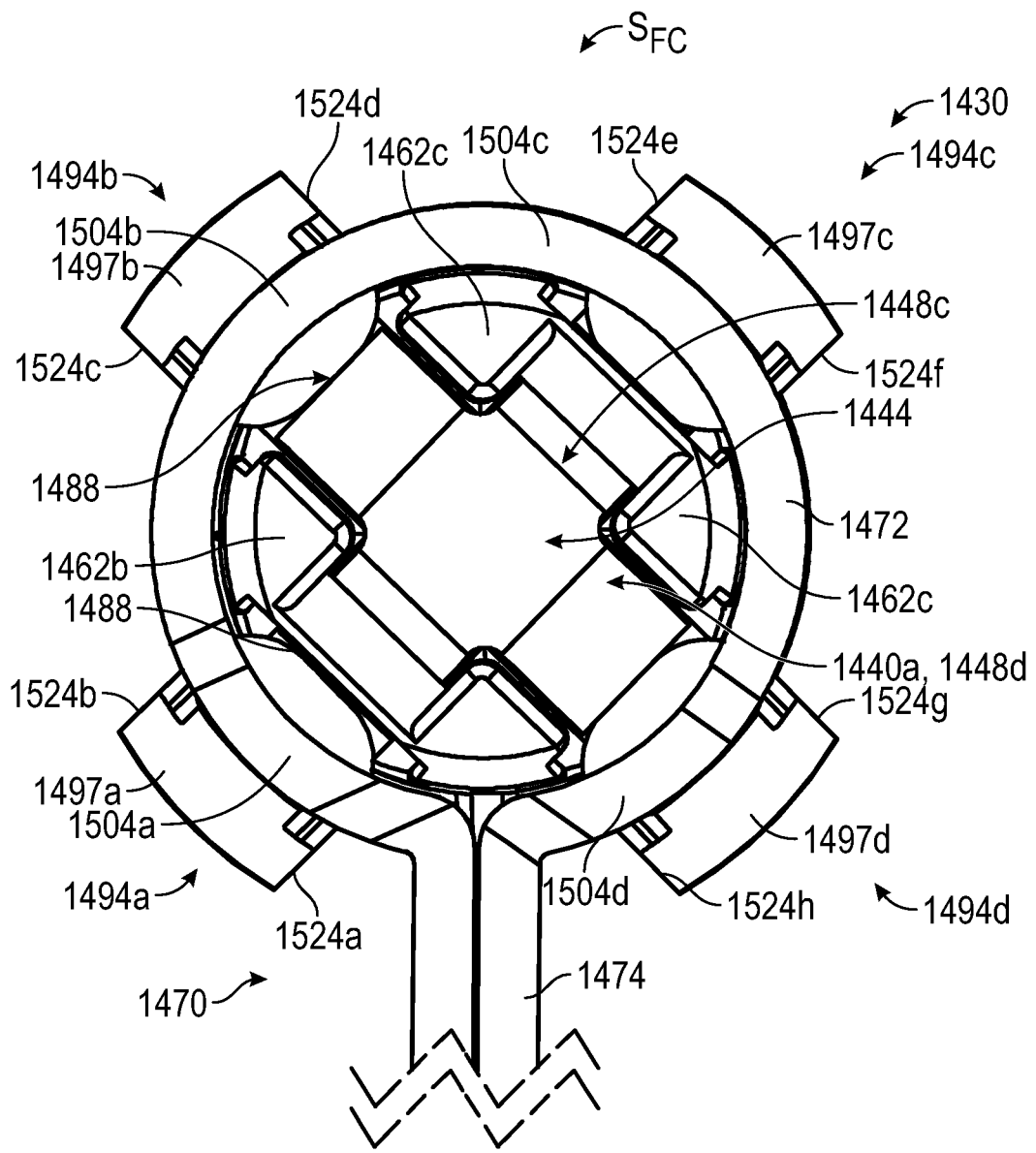
FIG. 9 is a partial top view of the male terminal assembly of FIG. 8 in the fully coupled state SFC.
Figure 18:
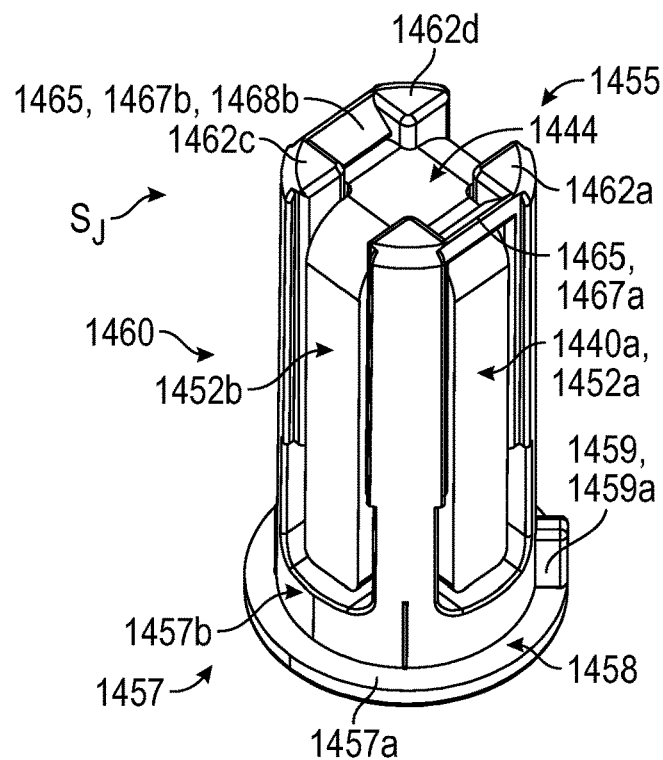
FIG. 18 is a perspective view of the spring assembly of the male terminal assembly of FIG. 8, showing the spring assembly in a joined state $S_J$.
Figure 19:
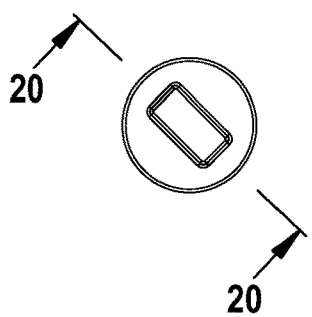
FIG. 19 is a bottom view of the spring assembly of FIG. 18.
Figure 20:
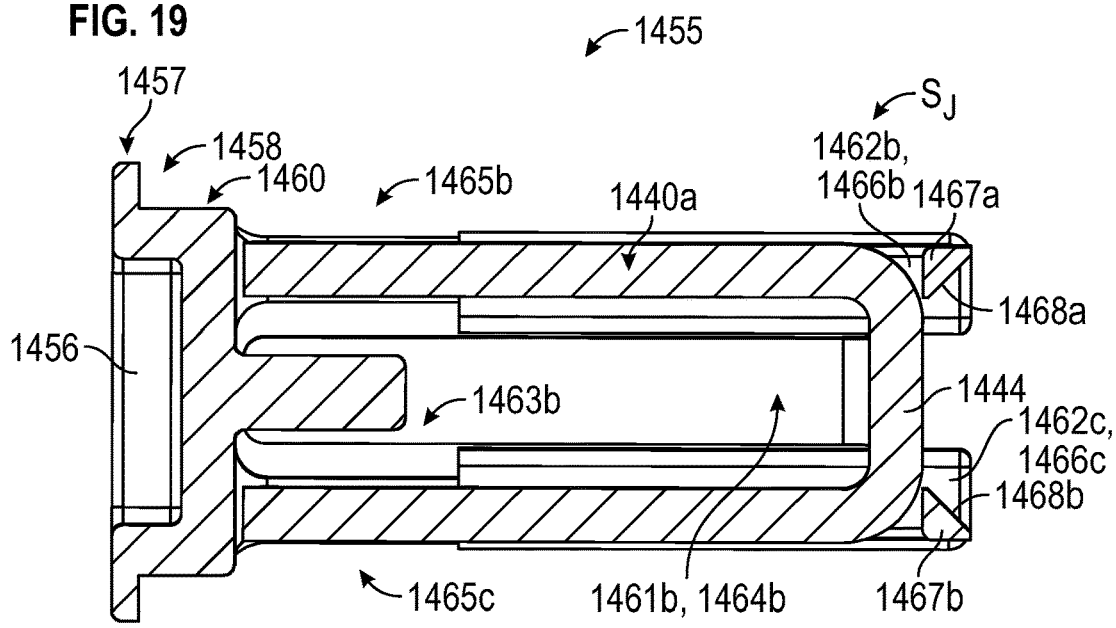
FIG. 20 is a cross-sectional view of the spring assembly taken along line 20-20 of FIG. 19.

Positioning the internal spring member 1440a within the male terminal assembly 1430 occurs across multiple steps or stages. FIG. 7 provides the first embodiment of the spring assembly 1455 in a un-joined state $S_{UJ}$, while FIG. 18-20 shows the first embodiment of the spring assembly in a joined state $S_J$. As described above, to move the spring assembly 1455 from the un-joined state $S_{UJ}$ to the joined state $S_J$, the user or assembler aligns the spring member 1440a—namely, the spring arm 1452a-1452d—with the spring arm apertures 1461a-1461d of the spring holder 1456. After these components are aligned, the user applies a compressive force on these components in order to temporally elastically deform the positioning structures 1462a-1462d in order to allow the spring member 1440a to overcome the retaining means 1465. Once the spring member 1440a is positioned within the holder 1456, the positioning structures 1462a-1462d will return to their undeformed/original state, whereby securing the spring member 1440a within the holder 1456 via the retaining means 1465.

The joined $S_J$ spring assembly 1455 is then inserted within the male terminal body 1472. The is accomplished by positing the body portion 1460 within the spring receiver 1486 of the male terminal body 1472 and applying a insertion force, $F_I$ that presses both of these components into one another. While the user or assembler is applying this insertion force, $F_I$, the user or assembler must align the alignment mechanism 1459 with the alignment receptacle 1476 in order to move the male terminal assembly from the un-coupled $S_{UC}$ to the fully coupled state $F_C$. To align the alignment mechanism 1459 with the alignment receptacle 1476, the assembler may have to twist the spring assembly 1455 within the male terminal body 1472. Once the rear extent of the exterior portion 1457a is positioned adjacent to an end of male terminal body 1472, the male terminal assembly 1430 is in the fully coupled state $F_C$.

A strain relief assembly 1800 includes multiple components, such as a strain relief cap 1810, which are design to relieve the strain that is placed on the connection between the male terminal assembly 1430 and the wire 1530. Additional details about this strain relief assembly are disclosed in connection PCT/US2019/36070, which is fully incorporated herein by reference.

2) Female Connector Assembly

The female connector assembly 2000 is primarily composed of the female terminal assembly 2430. The female terminal assembly 2430 includes a side wall arrangement 2434 that form a female receptacle 2472 that is designed to receive an extent of the male terminal assembly 1430 in order to electrically and mechanically a device coupled to the male connector assembly 1000 to a device that is coupled to the component header 3000. The cross-sectional shape of the female receptacle 2472 is substantially circular and its diameter is approximately 10.3 mm. As such, this diameter is approximately 5% smaller than the outside diameter of the male terminal assembly 1430 (measured at the widest extent of the contact arms 1494a-1494d, which is approximately 10.8 mm). As discussed within PCT/US2019/36070, PCT/US2019/36010, this positional relationship compresses the spring member 1440a when the male terminal assembly 1430 is inserted into the female terminal assembly 2430 to ensure that the male terminal assembly 1430 make a proper electrical and mechanical connection with the female terminal assembly 2430. Additional details about the female terminal assembly 2430 are generally discussed PCT Application Nos. PCT/US2019/36127, PCT/US2019/36070, PCT/US2019/36010 and as such these details will not be repeated here. However, generally the female terminal assembly 2430 may be made for a conductive material (e.g., copper) and may be stamped, pressed, drawn, model, cast, printed, or a similar method of manufacturing may be utilized.

3) Component Header

The component header 3000 is primarily composed of the female housing assembly, which is designed to protect and isolate the female terminal assembly 2430 from external structures. To accomplish this, the intermediate housing assembly 2100 receives the female terminal assembly 2430 within a receiver that is formed by a wall 2160. Said wall 2160 includes ramped or sloped wall arrangement 2162 that extends reward from the front edge of the housing 2100 and are designed to compress the contact arms 1494 of the terminal assemblies 1430 during the mating of the male and female terminal assemblies 1430, 2430. The configuration and design of these ramped or sloped wall arrangement 2162 is described in detail with PCT/US2019/36070, which is incorporated herein. These ramped or sloped wall 2162 has a rear edge that is configured to abut the frontal edge of the female terminal assembly 2430, when the female terminal assembly 2430 is properly positioned within the component header 3000.

4) Connecting the Connector System

FIGS. 1-2 show how the high power connector system 100 can move from a disconnected state $S_{DCON}$ to a fully connected state $S_{FCON}$. The high power connector system 100 can then move from this disconnected state $S_{DCON}$ to a partially connected state, where the contact arms 1494a-1494d of the male connector assembly 1000 are about to come into contact with the ramped or sloped surface 2162 of the female connector assembly 2000. This ramped or sloped surface 2162 gently and smoothly compresses the contact arms 1494a-1494p until they can easily slide into and make contact with the inner surface of the female receptacle 2472. This process is described in greater detail within PCT/US2019/36070 and is incorporated herein. Once the male connector assembly 1000 is fully connected to the female connector assembly 2000, the high power connector system 100 has moved from the partially connected state $S_{PCON}$ to the fully connected state $S_{FCON}$. Finally, a force is applied to the CPA 1170 that causes it to be interact with an extent of the component header 3000. Once this occurs, the male connector assembly 1000 is locked to the female connector assembly 2000. Finally, the installer can scan an extent of the CPA 1170 that is visible through the opening within the housing, as described within PCT/US20/49870.

Second Embodiment

As shown in FIGS. 29-35, the second embodiment of the connector system 4100 includes multiple components that are designed to electrically and mechanically connect one device or component to another device or component within a power distribution environment. The second embodiment of the connector system 4100 is primarily composed of: (i) a male connector assembly 5000 and (ii) a female connector assembly 6000. The male connector assembly 5000 includes: (i) housing assembly 5100, (ii) a male terminal assembly 5430, which includes a male terminal 5470, an internal spring assembly 5455 that includes a spring holder 5456 and a spring member 5440a, (iii) a male interlock assembly 5600, (iv) a strain relief assembly 5800, and (v) a wire 5495. The female connector assembly 6000 includes: (i) housing assembly 6100, and (ii) a female terminal assembly 6430, which includes a female terminal body 6434 that has a female receptacle 6472. The only difference between the first and second embodiment of the connector systems 100, 4100 is the configuration of: (i) housings 1100, 5100, 3000, 6100 and (ii) male terminal connection plate 1474, 5474. Otherwise, the terminal assemblies 1430, 2430, 5430, 6430 are identical across the embodiments 100, 4100.

Given the substantial overlap between these embodiments, it should be understood that reference numbers that are shown in the figures may be omitted from the specification for sake of brevity as like structures have like numbers. For example, the disclosure in connection with spring member 1440a is not repeated herein, but it applies to spring member 5440a, as if it were repeated herein. In other words, omitting reference numbers from the specification or specific disclosure of the functionality of that structure should not limit the disclosure of this application. Instead, one shall refer to the disclosure of similar structures that may be discussed within another section of this application or other applications that are incorporated herein by reference.

5) Terminal Properties and Functionality

Figure 34:
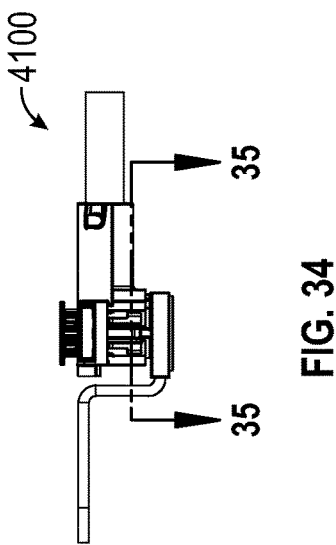
FIG. 34 is a side view of the connector system of FIG. 29.

FIG. 33-34 depicts a cross-section of the male connector assembly 5000 coupled to the female connector assembly 6000 in the fully connected state SFC. While the below disclosed is discussed in connection with said second embodiment of the system 4100, it should be understood that this disclosure applies in equal force to the first embodiment of the system 100. As best shown in FIG. 33, shown in the one or more outer surfaces of the spring arms 5452a-5452d contact the free ends 5488 of the respective contact arms 5494a-5494d. As discussed above, the outermost extent of the contact arms 5494a-5494d are slightly larger than the inner extent of the female terminal body 6434. As such, when these components are mated with one another, the spring member 5440a is compressed. This compression of the spring member 5440a creates an outwardly directed biasing force SBF against the contact arms 5494a-5494d and away from the interior of the spring member 5440a.

The male terminal body 5472, including the contact arms 5494a-5494d, may be formed from a first material such as copper, a highly-conductive copper alloy (e.g., C151 or C110), aluminum and/or another suitable electrically conductive material. The first material preferably has an electrical conductivity of more than 80% of IACS (International Annealed Copper Standard, i.e., the empirically derived standard value for the electrical conductivity of commercially available copper). For example, C151 typically has 95% of the conductivity of standard, pure copper compliant with IACS. Likewise, C110 has a conductivity of 101% of IACS. In certain operating environments or technical applications, it may be preferable to select C151 because it has anti-corrosive properties desirable for high-stress and/or harsh weather applications. The first material for the male terminal body 5472 is C151 and is reported, per ASTM B747 standard, to have a modulus of elasticity (Young's modulus) of approximately 115-125 gigapascals (GPa) at room temperature and a coefficient of terminal expansion (CTE) of 17.6 ppm/degree Celsius (from 20-300 degrees Celsius) and 17.0 ppm/degree Celsius (from 20-200 degrees Celsius).

The spring member 5440a may be formed from a second material such as spring steel, stainless steel (e.g., 301SS, ¼ hard), and/or another suitable material having greater stiffness (e.g., as measured by Young's modulus) and resilience than the first material of the male terminal body 5472. The second material preferably has an electrical conductivity that is less than the electrical conductivity of the first material. The second material also has a Young's modulus that may be approximately 193 GPa at room temperature and a coefficient of terminal expansion (CTE) of 17.8 ppm/degree Celsius (from 0-315 degrees Celsius) and 16.9 ppm/degree Celsius (from 0-100 degrees Celsius). In contemplated high-voltage applications, the cross-sectional area of copper alloy forming the first connector is balanced with the conductivity of the selected copper alloy. For example, when a copper alloy having lower conductivity is selected, the contact arms 5494a-5494d formed therefrom have a greater cross-sectional area so as to adequately conduct electricity. Likewise, selection of a first material having a higher conductivity may allow for contact arms 5494a-5494d having a relatively smaller cross-sectional area while still meeting conductivity specifications.

In an example embodiment, the CTE of the second material may be greater than the CTE of the first material, i.e., the CTE of the spring member 5440a is greater than the CTE of the male terminal body 5472. Therefore, when the assembly of the male terminal body 5472 and the spring member 5440a is subjected to the high-voltage and high-temperature environment typical for use of the electrical connector described in the present disclosure, the spring member 5440a expands relatively more than the male terminal body 5472. Accordingly, the outward force SBF produced by the spring member 5440a on the contact arms 5494a-5494d of the male terminal body 5472 is increased in accordance with the increased temperature, which is reference to below as a thermal spring force, $S_{TF}$.

An example application of the present disclosure, such as for use in a vehicle alternator, is suitable for deployment in a class 5 automotive environment, such as that found in passenger and commercial vehicles. Class 5 environments are often found under the hood of a vehicle, e.g., alternator, and present 150° Celsius ambient temperatures and routinely reach 200° Celsius. When copper and/or highly conductive copper alloys are subjected to temperatures above approximately 150° Celsius said alloys become malleable and lose mechanical resilience, i.e., the copper material softens. However, the steel forming the spring member 5440a retains hardness and mechanical properties when subjected to similar conditions. Therefore, when the male terminal body 5472 and spring member 5440a are both subjected to high-temperature, the first material of the male terminal body 5472 softens and the structural integrity of the spring member 5440a, formed from the second material, is retained, such that the force applied to the softened contact arms 5494a-5494d by the spring member 5440a more effectively displaces the softened contact arms 5494a-5494d outward relative the interior of the male terminal body 5472, in the fully connected position SFC.

The male terminal body 5472, spring member 5440a, and female terminal body 6434, are configured to maintain conductive and mechanical engagement while withstanding elevated temperatures and thermal cycling resulting from high-power, high-voltage applications to which the connector assembly is subjected. Further, the male terminal body 5472 and female terminal body 6434 may undergo thermal expansion as a result of the elevated temperatures and thermal cycling resulting from high-voltage, high-temperature applications, which increases the outwardly directed force applied by the male terminal body 5472 on the female terminal body 6434. The configuration of the male terminal body 5472, spring member 5440a, and the female terminal body 6434 increase the outwardly directed connective force therebetween while the connector system 4100 withstands thermal expansion resulting from thermal cycling in the connected position $P_C$.

Based on the above exemplary embodiment, the Young's modulus and the CTE of the spring member 5440a is greater than the Young's modulus and the CTE of the male terminal body 5472. Thus, when the male terminal body 5472 is used in a high power application that subjects the connector system 4100 to repeated thermal cycling with elevated temperatures (e.g., approximately 150° Celsius) then: (i) the male terminal body 5472 become malleable and loses some mechanical resilience, i.e., the copper material in the male terminal body 5472 softens and (ii) the spring member 5440a does not become as malleable or lose as much mechanical stiffness in comparison to the male terminal body 5472.

Thus, when utilizing a spring member 5440a that is mechanically cold forced into shape (e.g., utilizing a die forming process) and the spring member 5440a is subjected to elevated temperatures, the spring member 5440a will attempt to at least return to its uncompressed state, which occurs prior to insertion of the male terminals assembly 5430 within the female terminal assembly 6430, and preferably to its original flat state, which occurs prior to the formation of the spring member 5440a. In doing so, the spring member 5440a will apply a generally outward directed thermal spring force, STF, (as depicted by the arrows labeled "STF" in FIG. 36) on the free ends 5488 of the contact arms 5494a-5494d. This thermal spring force, $S_{TF}$, is dependent upon local temperature conditions, including high and/or low temperatures, in the environment where the system 4100 is installed. Accordingly, the combination of the spring biasing force, $S_{BF}$, and the thermal spring force, $S_{TF}$, provides a resultant biasing force, $S_{RBF}$, that ensures that the outer surface of the contact arms 5494a-5494d are forced into contact with the inner surface of the female terminal body 6434 when the male terminal assembly 2430 is inserted into the female terminal 6430 and during operation of the system 4100 to ensure an electrical and mechanical connection. Additionally, with repeated thermal cycling events, the male terminal assembly 5430 will develop an increase in the outwardly directed resultant spring forces, $S_{RBF}$, that are applied to the female terminal assembly 6430 during repeated operation of the system 4100.

Figure 35:
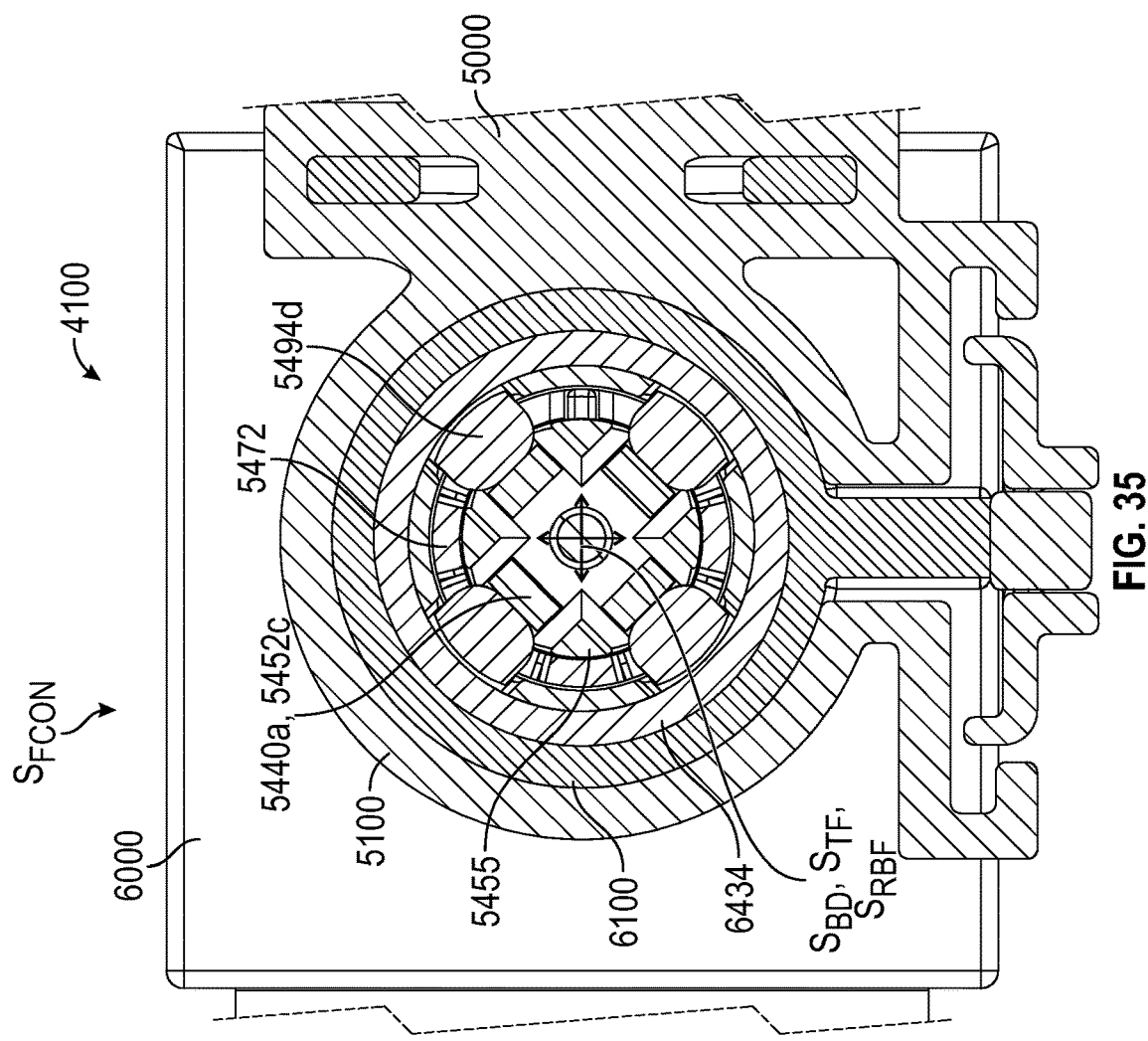
FIG. 35 is a cross-sectional view of the connector system taken along line 35-35 of FIG. 34.

Further illustrated in FIGS. 33 and 35, in the fully connected state $S_{FC}$, the male terminal assembly 5430 provides 360° compliance with the female terminal assembly 6430 to ensure that a sufficient amount of outwardly directed force F is applied by the male terminal assembly 5430 to the female terminal assembly 6430 for electrical and mechanical connectivity in all four primarily directions. This attribute allows for omission of a keying feature and/or another feature designed to ensure a desired orientation of the components during connection. The 360° compliance attribute of the system 4100 also aids in maintaining mechanical and electrical connection under strenuous mechanical conditions, e.g., vibration. In a traditional blade or fork-shaped connector with 180° compliance, i.e., connection on only two opposing sides, vibration may develop a harmonic resonance that causes the 180° compliant connector to oscillate with greater amplitude at specific frequencies. For example, subjecting a fork-shaped connector to harmonic resonance may cause the fork-shaped connector to open. Opening of the fork-shaped connector during electrical conduction is undesirable because momentary mechanical separation of the fork-shaped connector from an associated terminal may result in electrical arcing. Arcing may have significant negative effects on the 180° compliant terminal as well as the entire electrical system of which the 180° compliant terminal is a component. However, the 360° compliance feature of the present disclosure may prevent the possible catastrophic failures caused by strong vibration and electrical arcing.

6) Related Information for the Systems 100, 4100

The system 100, 4100 is a T4/V4/S3/D2/M2, wherein the system 100, 4100 meets and exceeds: (i) T4 is exposure of the system 100 to 150° C., (ii) V4 is severe vibration, (iii) S1 is sealed high-pressure spray, (iv) D2 is 200k mile durability, and (v) M2 is less than 45 Newtons of force is required to connect the male terminal assembly 1430, 3430, 5430 to the female terminal assembly 2430, 6430. In addition to being T4/V4/S3/D2/M2 compliant, the system 100, 4100 is push, click, tug, scan (PCTS) compliant, wherein additional information about this standard is disclosed within PCT/US2020/049870.

It should be understood that the male terminal assemblies 1430, 5430 and the female terminal assemblies 2430, 6430 disclosed within this application having the following specifications regarding carrying at 55° C. rise over ambient (RoA) or 80° C. with a derating of 80%: (i) wherein the diameter of the male terminal assembly 1430 is 6 mm and its rated to carry 153 amps with a 16 $mm^2$ wire, (ii) wherein the diameter of the male terminal assembly 1430 is 8 mm and its rated to carry 225 amps with a 25 $mm^2$ wire, (iii) wherein the diameter of the male terminal assembly 1430 is 10 mm and its rated to carry 300 amps with a 50 $mm^2$ wire, and (iv) wherein the diameter of the male terminal assembly 1430 is 12 mm and its rated to carry 375 amps with a 75 $mm^2$ wire. In comparison, conventional round connectors sold by Amphenol have the following rating at 80° C. with a derating of 80%: (i) wherein the diameter of the male terminal is 6 mm and its rated to carry 90 amps with a 16 mm² wire, (ii) wherein the diameter of the male terminal is 8 mm and its rated to carry 130 amps with a 25 mm² wire, and (iii) wherein the diameter of the male terminal is 10 mm and its rated to carry 220 amps with a 50 mm² wire. As such, the disclosed connector system 100 provides current carrying capabilities that are substantially higher than the current carry capabilities of conventional round connectors sold by Amphenol. In particular, the disclosed connector system 100 can carry 41% more current with the 6 mm terminal, 42% more current with the 8 mm terminal, and 27% more current with the 10 mm terminal. These substantial increases in current carrying capacity, while meeting the USCAR specifications provides considerable advantages of the prior art connectors.

The spring member 1440a, 5440a disclosed herein may be replaced with the spring members shown in PCT/US2019/36010 or U.S. Provisional 63/058,061. Further, it should be understood that alternative configurations for connector assembles 1000, 2000, 5000, 6000 are possible. For example, any number of male terminal assemblies 1430, 5430 (e.g., between 2-30, preferably between 2-8, and most preferably between 2-4) may be positioned within a housing 1100, 5100. Additionally, alternative configurations for connector systems 100, 4100 are possible. For example, the female connector assembly 2000, 6000 may be reconfigured to accept these multiple male terminal assemblies 1430, 5430 into a single female terminal assembly 2430, 6430.

It should also be understood that the male terminal assemblies may have any number of contact arms 1494, 5494 (e.g., between 2-100, preferably between 2-50, and most preferably between 2-8) and any number of spring arms 1452, 5452 (e.g., between 2-100, preferably between 2-50, and most preferably between 2-8). As discussed above, the number of contact arms 1494, 5494 may not equal the number of spring arms. For example, there may be more contact arms 1494, 5494 then spring arms 1452, 5452. Alternatively, there may be less contact arms 1494, 5494 then spring arms 1452, 5452.

Materials and Disclosure that are Incorporated by Reference

PCT Application Nos. PCT/US21/43686, PCT/US2021/033446, PCT/US2020/050018, PCT/US2020/049870, PCT/US2020/014484, PCT/US2020/013757, PCT/US2019/036127, PCT/US2019/036070, PCT/US2019/036010, and PCT/US2018/019787, U.S. patent application Ser. No. 16/194,891 and U.S. Provisional Applications 62/681,973, 62/792,881, 62/795,015, 62/897,658 62/897,962, 62/988,972, 63/051,639, 63/058,061, 63/068,622, 63/109,135, 63/159,689, 63/222,859, each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935—18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc Specifications, including: ANSFESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof. While some implementations have been illustrated and described, numerous modifications come to mind without significantly departing from the spirit of the disclosure; and the scope of protection is only limited by the scope of the accompanying claims. For example, the overall shape of the of the components described above may be changed to: a triangular prism, a pentagonal prism, a hexagonal prism, octagonal prism, sphere, a cone, a tetrahedron, a cuboid, a dodecahedron, an icosahedron, an octahedron, a ellipsoid, or any other similar shape.

It should be understood that the following terms used herein shall generally mean the following:

a. "High power" shall mean (i) voltage between 20 volts to 600 volts regardless of current or (ii) at any current greater than or equal to 80 amps regardless of voltage.

b. "High current" shall mean current greater than or equal to 80 amps regardless of voltage.

c. "High voltage" shall mean a voltage between 20 volts to 600 volts regardless of current.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. An electrical connector system for use in a power distribution assembly, the electrical connector system comprising:
   an electrically conductive male terminal body having (i) a side wall arrangement with a substantially cylindrical configuration, the side wall arrangement defining a spring receiver, and (ii) a contact arm extending from a first side wall of the side wall arrangement, the contact arm having:
   (a) a first lateral edge,
   (b) a second lateral edge,
   (c) a first contact arm extent coupled to the first side wall and having a first width that extends between the first and second lateral edges, and
   (d) a second contact arm extent coupled to the first contact arm extent and having a second width that extends between the first and second lateral edges, and wherein the second width is greater than the first width; and
   an internal spring member dimensioned to reside within the spring receiver of the male terminal body, the spring member comprising at least one spring arm having a radially outward bias,
   wherein, when the spring member is inserted into the spring receiver, the at least one spring arm underlies at least a portion of the second contact arm extent of the contact arm and independently applies a radially outward force on the contact arm.

2. The electrical connector system according to claim 1, wherein in a fully coupled state $S_{FC}$, the internal spring member is positioned within the spring receiver of the male terminal body and the contact arm includes a free-end that resides against an outer surface of the spring arm.

3. The electrical connector system according to claim 1, further comprising a spring holder having (i) first portion configured to abut an extent of a frontal segment of the male terminal body in a joined state $J_S$ and (ii) a second portion configured to receive the internal spring member.

4. The electrical connector system of claim 3, wherein the first portion of the spring holder includes an alignment mechanism that is received by an alignment receptacle formed in the frontal segment of the male terminal body; and
   wherein the alignment mechanism and the alignment receptacle interact to maintain alignment of the internal spring member within the male terminal body.

5. The electrical connector system of claim 3, wherein the second portion of the spring holder includes a retaining member configured to secure the internal spring member within the spring holder.

6. The electrical connector system of claim 5, wherein the retaining member includes two lateral beams that are configured to be positioned rearward of a rear wall of the internal spring member when the internal spring member and the spring holder are in the joined state $J_S$.

7. The electrical connector system of claim 1, further comprising a spring holder with a spring aperture positioned between a first positioning structure of the spring holder and a second positioning structure of the spring holder; and
   wherein the first positioning structure is configured to be positioned on a first side of the spring arm and the second positioning structure is configured to be positioned on a second side of the spring arm opposite the first side of the spring arm when the internal spring member and the spring holder are in a joined state $J_S$.

8. The electrical connector system of claim 1, further comprising a spring holder having a spring aperture with: (i) a frontal portion, and (ii) a rear portion that extends rearwardly from the frontal portion of the spring aperture; and
   wherein the frontal portion of the spring aperture is larger than the rear portion of the spring aperture.

9. The electrical connector system of claim 1, wherein the male terminal body has a 8 mm outer diameter, a current carrying capacity of 225 amps at a derating of 80% at 80° C., and does not include a lever assist.

10. The electrical connector system of claim 1, wherein the male terminal body has a 10 mm outer diameter, a current carrying capacity of 300 amps at a derating of 80% at 80° C., and does not include a lever assist.

11. The electrical connector system of claim 1, wherein the electrical connector system meets SAE/USCAR-2 Revision 6 specifications.

12. An electrical connector system in a power distribution assembly, the electrical connector system comprising:
   an electrically conductive male terminal body having a spring receiver and a side wall, wherein the side wall includes a contact arm with:
   (i) a first lateral edge with a first notch formed therein, wherein the first notch has a first portion and a second portion,
   (ii) a second lateral edge with a second opposed notch formed therein, wherein the second notch has a first portion and a second portion,
   (iii) a first contact arm extent that extends from the side wall to the first portions of the first and second notches, and wherein the first contact arm extent has a first width that extends between the first and second lateral edges,
   (iv) a second contact arm extent that extends from the second portions of the first and second notches to a free-end, and wherein the second contact arm extent has a second width that extends between the first and second lateral edges; and
   an internal spring member dimensioned to completely reside within the spring receiver of the male terminal body, the spring member having at least one spring arm having a radially outward bias,
   wherein, when the spring member is inserted into the spring receiver, the at least one spring arm underlies an extent of the contact arm and independently applies a radially outward force on the contact arm.

13. The electrical connector system according to claim 12, wherein a fully coupled state $S_{FC}$, the internal spring member is positioned within the spring receiver of the male terminal body and the free-end of the contact arm resides against an outer surface of the spring arm.

14. The electrical connector system according to claim 12, wherein the side wall of the electrically conductive male terminal body includes a contact arm opening with:
   (i) a first contact arm opening width extending between the first lateral edge of the first contact arm extent and a first internal edge of the side wall, (ii) a second contact arm opening width extending between the first lateral edge of the second contact arm extent and the first internal edge of the side wall, and (iii) wherein the first contact arm opening width is less than the second contact arm opening width.

15. The electrical connector system according to claim 14, wherein the electrically conductive male terminal body includes a frontal segment coupled to the side wall and positioned forward of the contact arm opening.

16. The electrical connector system according to claim 15, further comprising a spring holder having (i) a first portion configured to abut an extent of the frontal segment of the male terminal body in a joined state $J_S$ and (ii) a second portion configured to receive the internal spring member.

17. The electrical connector system according to claim 12, further comprising a spring holder with (i) a first portion configured to be positioned outside of the spring receiver in a joined state $J_S$ and (ii) a second portion configured to be positioned inside of the spring receiver in the joined state $J_S$.

18. The electrical connector system of claim 17, wherein the first portion of the spring holder includes an alignment mechanism that is received by an alignment receptacle formed in the male terminal body in the joined state $J_S$, and wherein the alignment mechanism and the alignment receptacle function together in order to maintain alignment the internal spring member within the male terminal body in the joined state $J_S$.

19. The electrical connector system of claim 18, wherein the second portion of the spring holder includes a retaining member configured to secure the internal spring member within the spring holder.

20. The electrical connector system of claim 12, wherein the male terminal body has a 8 mm outer diameter, a current carrying capacity of 225 amps at a derating of 80% at 80° C., and does not include a lever assist.

21. The electrical connector system of claim 12, wherein the electrical connector system meets SAE/USCAR-2 Revision 6 specification.

22. The electrical connector system of claim 12, further including a male housing assembly configured to partially encase the electrically conductive male terminal body, and wherein the male housing assembly further includes a connector position assurance component.

23. An electrical connector system for use in a power distribution assembly, the electrical connector system comprising:
an electrically conductive male terminal body comprising a side wall with a contact arm, the male terminal body defining a spring receiver and an alignment receptacle, wherein the male terminal body has a substantially cylindrical configuration; and
an internal spring assembly including:
(i) an internal spring member having at least one spring arm having a radially outward bias, wherein, when the spring member is inserted into the spring receiver, the at least one spring arm underlies at least a portion of the contact arm and independently applies a radially outward force on the contact arm; and
(ii) a spring holder dimensioned to reside within the spring receiver, the spring holder having an alignment mechanism that is positioned within the alignment receptacle in a joined state $J_S$ to ensure alignment of the internal spring member within the male terminal body.

24. The electrical connector system of claim 23, wherein a rear portion of the spring holder includes a retaining member configured to secure the internal spring member within the spring holder.

25. The electrical connector system of claim 24, wherein the retaining member includes two lateral beams that are configured to be positioned rearward of a rear wall of the internal spring member when the internal spring member and the spring holder are in the joined state $J_S$.

26. The electrical connector system of claim 23, wherein the spring holder includes a spring aperture located between a first positioning structure of the spring holder and a second positioning structure of the spring holder; and
wherein the first positioning structure is configured to be positioned on a first side of the spring arm and the second positioning structure is configured to be positioned on a second side of the spring arm opposite of the first side of the spring arm when the internal spring member and the spring holder are in the joined state $J_S$.

27. The electrical connector system of claim 26, wherein the spring aperture includes (i) a frontal portion that is positioned near the alignment mechanism and (ii) a rear portion that extends rearwardly from the frontal portion of the spring aperture; and
wherein the frontal portion of the spring aperture is larger than the rear portion of the spring aperture.

28. The electrical connector system according to claim 23, wherein the contact arm of the male terminal body extends (i) away from a rear portion of the electrically conductive male terminal body, (ii) across an extent of a contact arm opening, and (iii) towards a front portion of the electrically conductive male terminal body.

29. The electrical connector system according to claim 28, wherein the contact arm opening includes:
(i) a first contact arm opening width extending between a first lateral edge of the contact arm and a first internal edge of the side wall,
(ii) a second contact arm opening width extending between the first lateral edge of the contact arm and the first internal edge of the side wall, and
wherein the first contact arm opening width is less than the second contact arm opening width.

30. The electrical connector system according to claim 28, wherein the contact arm includes:
(i) a first lateral edge with a first notch formed therein, wherein the first notch has a first portion and a second portion,
(ii) a second lateral edge with a second opposed notch formed therein, wherein the second notch has a first portion and a second portion,
(iii) a first contact arm extent that extends from the side wall to the first portions of the first and second notches, and wherein the first contact arm extent has a first width that extends between the first and second lateral edges, and
(iv) a second contact arm extent that extends from the second portions of the first and second notches to a free-end, and wherein the second contact arm extent has a second width that extends between the first and second lateral edges.

31. The electrical connector system of claim 23, further including an electrically conductive female terminal body with a receptacle dimensioned to receive a portion of both the male terminal body and the internal spring member residing within the spring receiver of the male terminal body to define a fully connected state $S_{FC}$; and wherein the electrically conductive male terminal body includes the side wall with the contact arm having a free end, wherein the free end of the contact arm is configured to be displaced inward from an original position when the electrical connector system is in the fully connected state $S_{FC}$.

32. The electrical connector system of claim 23, wherein the male terminal body has a 8 mm outer diameter, a current carrying capacity of 225 amps at a derating of 80% at 80° C., and does not include a lever assist.

* * * * *